(12) United States Patent  
Kakuma

(10) Patent No.: US 6,363,168 B1  
(45) Date of Patent: Mar. 26, 2002

(54) MEASUREMENT POSITION DETERMINATION ON A SEMICONDUCTOR WAFER

(75) Inventor: Hiroaki Kakuma, Kyoto (JP)

(73) Assignee: Dainippon Acreen Mfg. Co., Ltd. (JP)

( * ) Notice: Subject to any disclaimer, the term of this patent is extended or adjusted under 35 U.S.C. 154(b) by 0 days.

(21) Appl. No.: 09/177,357

(22) Filed: Oct. 23, 1998

(30) Foreign Application Priority Data

Oct. 29, 1997  (JP) .............................................. 9-314286

(51) Int. Cl.[7] .................................................. G06K 9/00
(52) U.S. Cl. ......................................... 382/151; 348/87
(58) Field of Search ........................ 382/151; 250/559.3, 250/559.37; 356/375; 348/87, 95; 414/936; 438/16

(56) References Cited

U.S. PATENT DOCUMENTS 4,969,199 A  * 11/1990  Nara ........................... 382/146
5,867,590 A  *  2/1999  Eylon .......................... 382/151
5,989,761 A  * 11/1999  Kawakubo et al. ............ 430/22
6,107,637 A  *  8/2000  Watanabe et al. ......... 250/559.3

OTHER PUBLICATIONS

Related U.S. Patent Appln. No. 08/890,684.

* cited by examiner

Primary Examiner—Joseph Mancuso  
Assistant Examiner—Ali Bayat  
(74) Attorney, Agent, or Firm—Ostrolenk, Faber, Gerb & Soffen, LLP

(57) ABSTRACT

A measurement recipe includes measurement positions, which are expressed by coordinates in a wafer coordinate system defined on the wafer, and therefore the measurement recipe is applicable to a plurality of measurement devices. The coordinates of the respective measurement points in the wafer coordinate system are transformed into the coordinates in a stage coordinate system defined on a stage of a measuring device. This enables the respective measurement points on the wafer to be positioned by the coordinates in the stage coordinate system of the measuring device.

12 Claims, 30 Drawing Sheets

Fig. 3(A)  PRE-PROCESS WITH REFERENCE WAFER
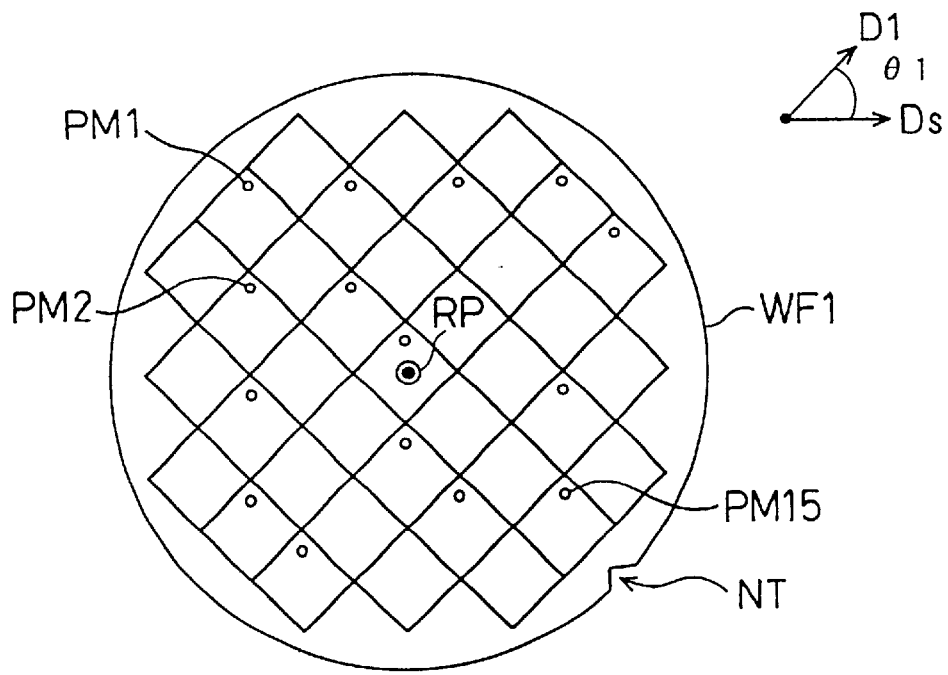
Fig. 3(B)  ALIGNMENT PROCESS WITH TARGET WAFER
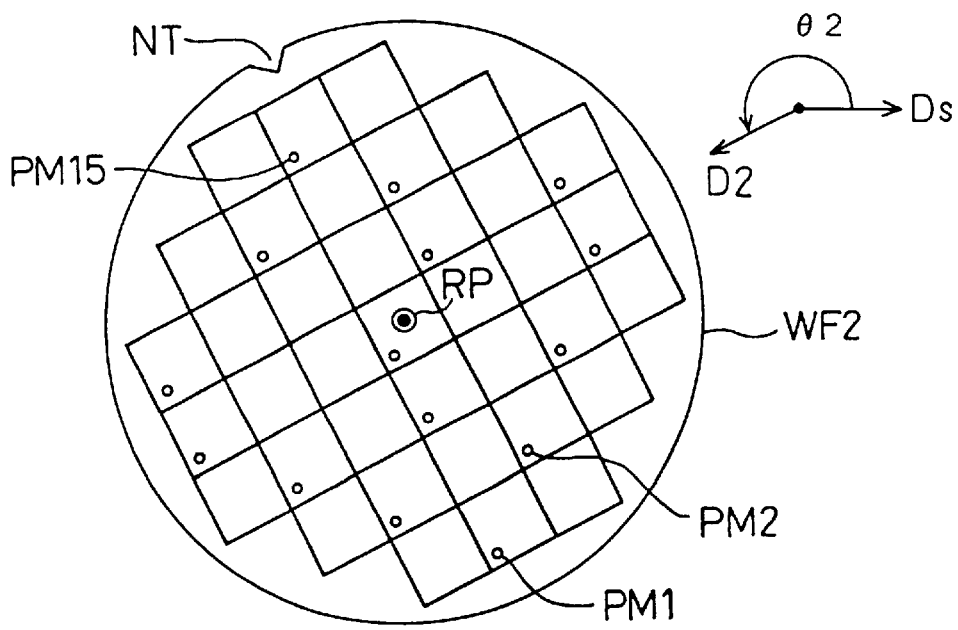

EDGE PIXELS

HORIZONTAL OPERATOR

VERTICAL OPERATOR

SOBEL OPERATORS

SOBEL (HORIZONTAL) OPERATOR    PIXEL VALUES    HORIZONTAL EDGE VALUE $$\begin{aligned}\text{HORIZONTAL} \\ \text{EDGE VALUE}\end{aligned} = \begin{aligned}&(-1 \times 3) + (0 \times 3) + (1 \times 4) + \\ &(-2 \times 3) + (0 \times 4) + (2 \times 5) + \\ &(-1 \times 4) + (0 \times 5) + (1 \times 5) = 6\end{aligned}$$

VERTICAL EDGE VALUE=0
HORIZONTAL EDGE VALUE=4 → ANGLE $=\tan^{-1}(0/4)$
$= 0°$

VERTICAL EDGE VALUE=1
HORIZONTAL EDGE VALUE=1 → ANGLE $=\tan^{-1}(1/1)$
$= 45°$

CALCULATION OF ANGLE UTILIZING EDGE
DETECTION WITH SOBEL OPERATORS

IMAGE

ANGLE HISTOGRAM

FREQUENCY

40°   130°   180°

ANGLE α

Fig. 17(A) CAPTURED MULTI-TONE IMAGE
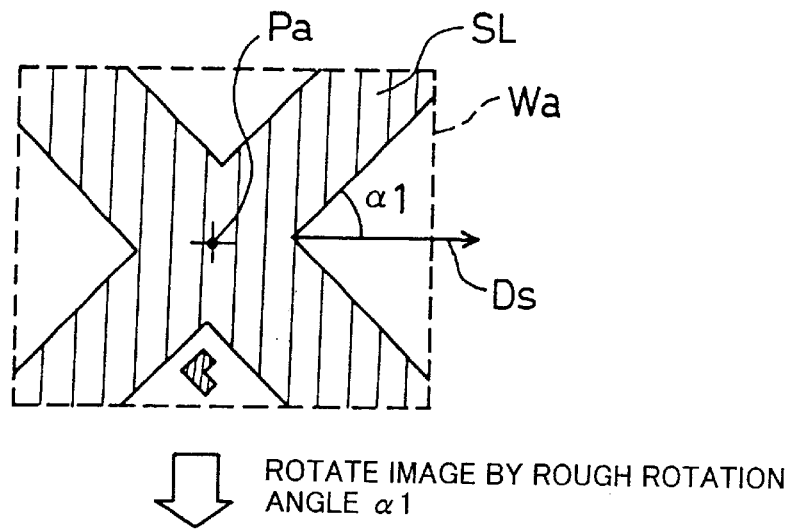
ROTATE IMAGE BY ROUGH ROTATION ANGLE α1
Fig. 17(B)
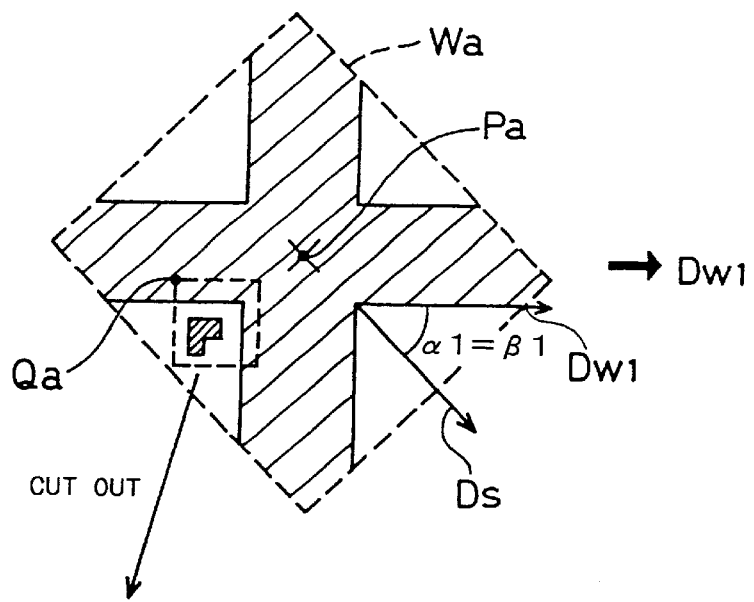
CUT OUT
Fig. 17(C) REGISTERED FIRST TEMPLATE IMAGE MPa

TRANSFORMATION BETWEEN IMAGE COORDINATES (U, V)ic
AND STAGE COORDINATES (X, Y)sc $$[X \quad Y \quad 1] = [U \quad V \quad 1] \begin{bmatrix} \cos\delta & \sin\delta & 0 \\ -\sin\delta & \cos\delta & 0 \\ X1 & Y1 & 1 \end{bmatrix}$$

Fig. 19
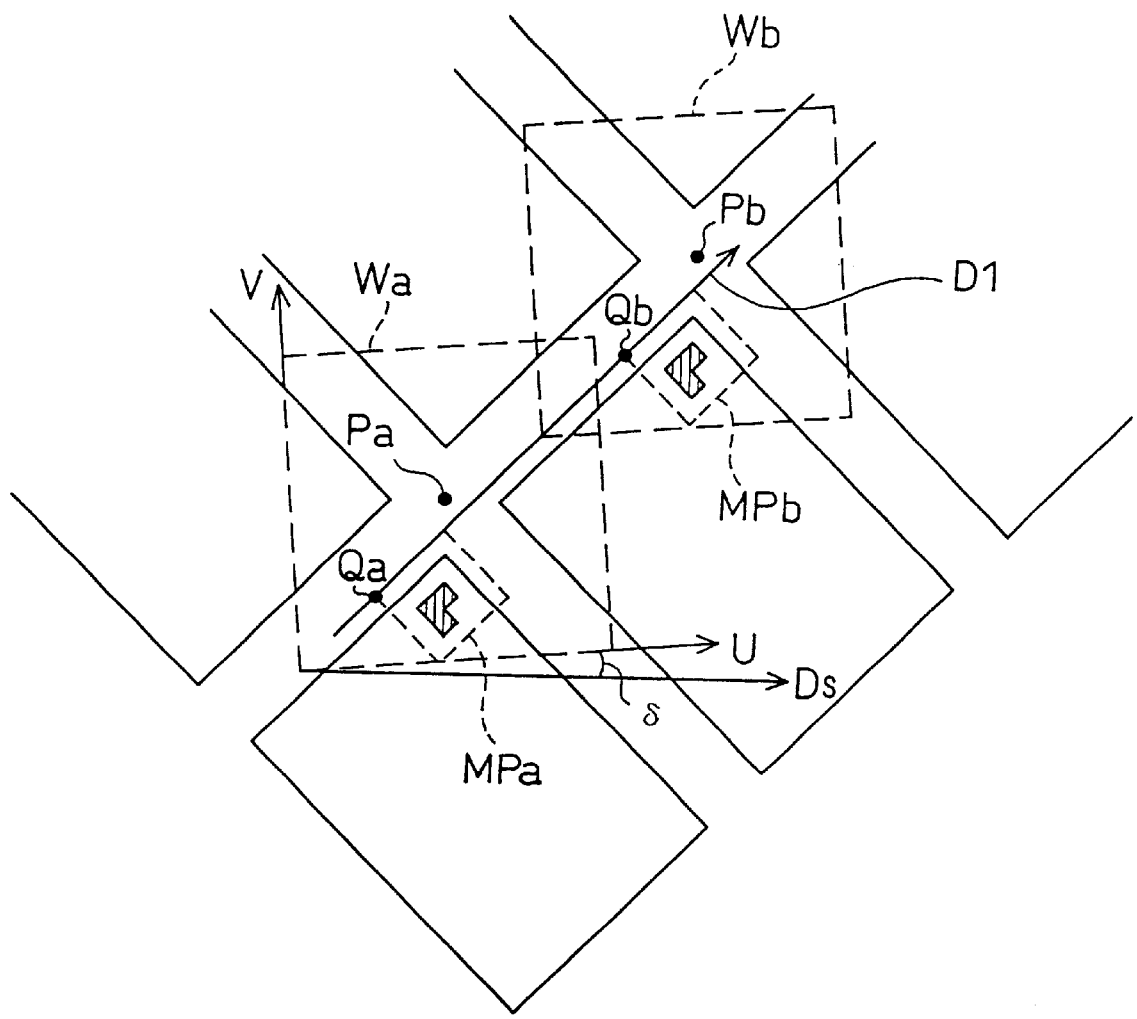
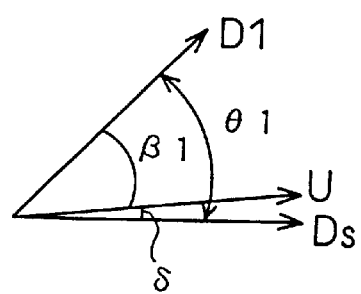

FINE ALIGNMENT PRE-PROCESS WITH REF. WAFER

OFFSET IN FINE ALIGNMENT

Fig. 26(A)
CAPTURED IMAGE
Fig. 26(B)
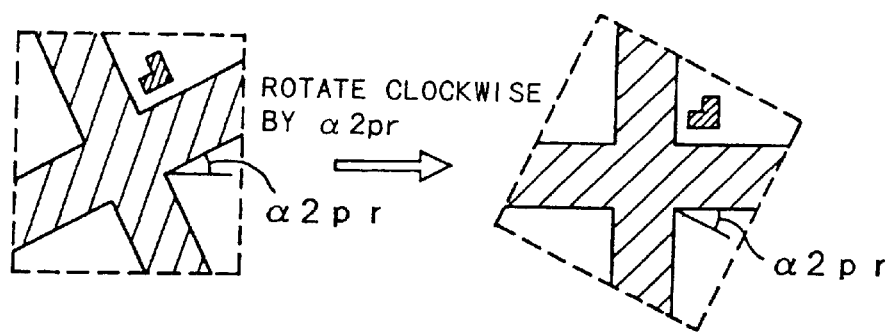
Fig. 26(C)
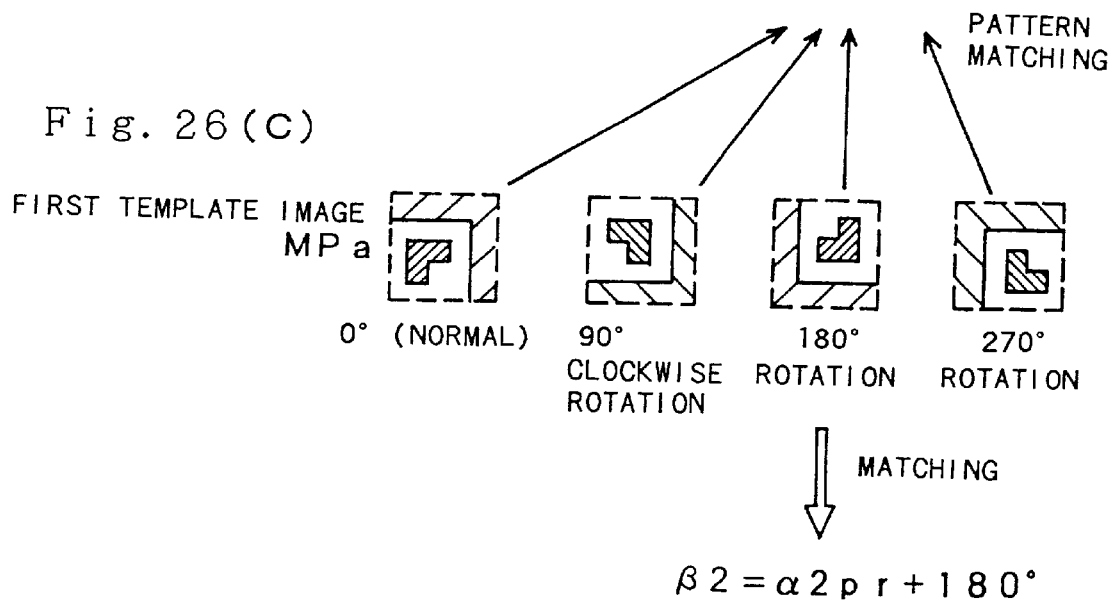
$\beta 2 = \alpha 2pr + 180°$ PRELIMINARY ROTATION ANGLE α 2pr
AND IMAGE ROTATION ANGLE β 2 OF TARGET WAFER Fig. 28(a)
0 degree
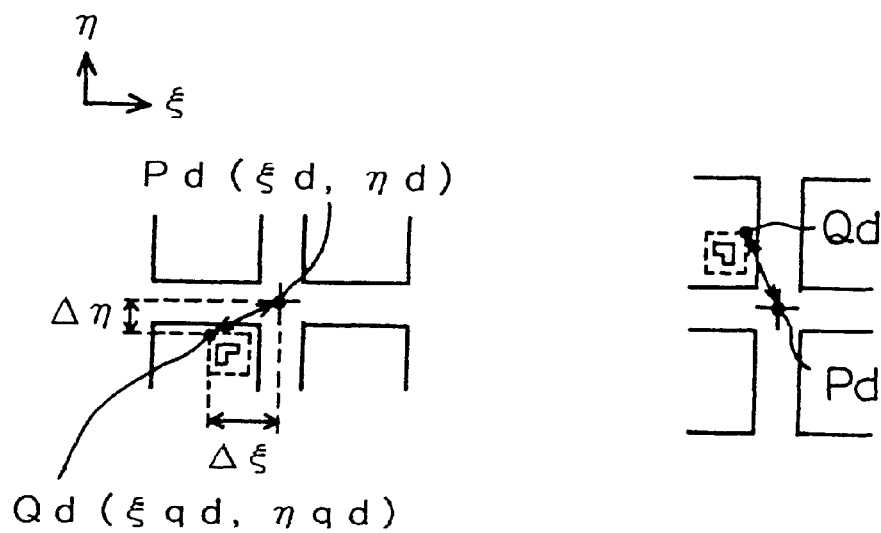
Fig. 28(b)
90 degrees
Fig. 28(c)
180 degrees
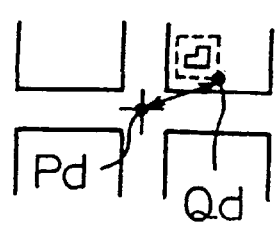
Fig. 28(d)
270 degrees
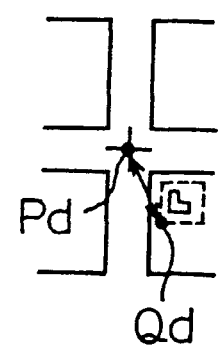

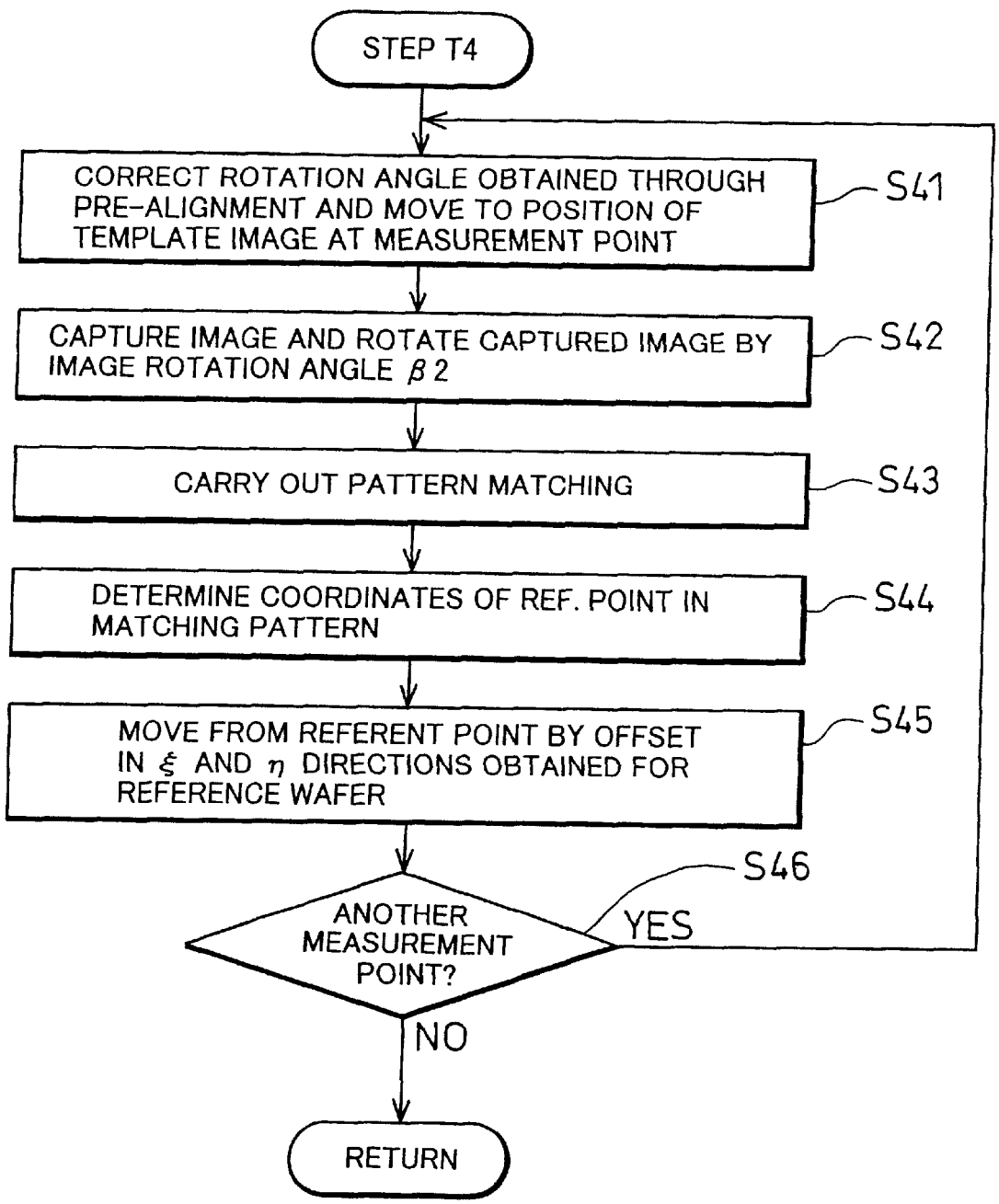

FINE ALIGNMENT

MEASUREMENT POSITION DETERMINATION ON A SEMICONDUCTOR WAFER

BACKGROUND OF THE INVENTION

1. Field of the Invention

The present invention relates to a technique of generating measurement information regarding measurement points on a semiconductor wafer and determining positions of the measurement points based on the measurement information.

2. Description of the Related Art

Semiconductor wafers are subjected to various tests with a variety of measurement devices in its manufacturing process. In the course of a specific measurement, a positioning process (alignment process) is carried out to position a measurement probe (such as an optical element or an electrode) precisely at a predetermined measurement point on a wafer.

In some cases, it is desired to carry out a certain measurement with a plurality of measurement devices. Each wafer can, however, take various orientations and positions in the respective measurement devices, and the coordinates of measurement points on the wafer will have different values in different measurement devices. It is accordingly impossible to commonly apply the same measurement information indicating measurement positions on a wafer to the plurality of measurement devices.

In a similar manner, when a plurality of wafers are sequentially mounted on one measurement device, the coordinates of measurement points on the respective wafers may have different values. For example, in the case where the orientations of the wafers set in the measurement device are not accurately fixed but have arbitrary angles to some extent, the respective wafers have different coordinate values for the measurement points. Namely it is rather difficult to accurately determine the positions of the measurement points even in one measurement device.

SUMMARY OF THE INVENTION

One object of the present invention is to provide a technique of commonly applying measurement information indicating measurement positions on a wafer to a plurality of measurement devices.

Another object is to provide a technique of determining the positions of measurement points on a wafer based on such measurement information.

In order to attain at least part of the above and other objects of the present invention, there is provided a method of determining a measurement position on a semiconductor wafer mounted on a stage of a measuring device. The method comprises the steps of: providing measurement information regarding a plurality of measurement points on the wafer, wherein the measurement information includes at least positions of the measurement points on the wafer, and wherein the position of each measurement point is expressed by coordinates in a wafer coordinate system defined on the wafer; and determining a position of each measurement point on the wafer mounted on the stage on the basis of the measurement information.

Since the position of each measurement point is expressed by coordinates in the wafer coordinate system, the measurement information including positions can be commonly applied to a plurality of measurement devices. Even when it is difficult to mount a wafer on the stage the measurement device at a constant position and orientation, the measurement information can be used for determining the positions of the measurement points on each wafer.

The step of determining a position of each measurement point may comprise the steps of: (a) providing first transform coefficients for coordinate transformation between a stage coordinate system defined on the stage and the wafer coordinate system; (b) transforming coordinates of each measurement point in the wafer coordinate system which are included in the measurement information into first coordinates in the stage coordinate system using the first transform coefficients; and (c) positioning each measurement point on the wafer mounted on the stage using the first coordinates of each measurement point in the stage coordinate system.

The measuring device may comprise an image pickup device for capturing an image on the wafer mounted on the stage. In this case, the step (a) may comprise the step of providing second transform coefficients for coordinate transformation between the stage coordinate system and an image coordinate system defined within an image captured by the image pickup device; and the step (c) may comprise the steps of: i) moving the image pickup device according to the first coordinates in the stage coordinate system obtained at step (b); ii) capturing an image by the stage coordinate system; iii) determining coordinates of each measurement point in the image coordinate system; iv) transform coordinates in the image coordinate system into second coordinates in the stage coordinate system using the second transform coefficients; and v) positioning each measurement point on the wafer mounted on the stage according to the second coordinates of each measurement point in the stage coordinate system.

Even when the image coordinate system is inclined to the stage coordinate system, this arrangement enables the coordinates of an arbitrary point in the captured image to be determined accurately in the stage coordinate system.

The measurement information may further include a template image and a positional offset between a reference point of the template image and each measurement point, wherein the template image is to be used to determine the position of each measurement point by carrying out pattern matching on an image captured by the image pickup device. The step iii) may comprises the steps of: carrying out the pattern matching on the image captured by the image pickup device in the vicinity of each measurement point to obtain a matching pattern that matches the template image; and determining the position of each measurement point from a position of a reference point of the matching pattern and the positional offset.

The pattern matching using the template image determines the position of each measurement point with a high accuracy.

The measurement information may further include measurement conditions at each measurement point, and the method may further comprise the step of: carrying out measurement at each measurement point under the measurement conditions.

The present invention is also directed to a measuring device for determining a measurement position on a semiconductor wafer mounted on a stage of the measuring device. The device comprising: a memory for storing measurement information regarding a plurality of measurement points on the wafer, wherein the measurement information includes at least positions of the measurement points on the wafer, the position of each measurement point being expressed by coordinates in a wafer coordinate system defined on the wafer; and a position determination unit which determines a position of each measurement point on the wafer mounted on the stage on the basis of the measurement information.

The present invention is further directed to a computer program product for determining a measurement position on a semiconductor wafer mounted on a stage of a measuring device. The computer program product comprises: a computer readable medium; and a computer program stored on the computer readable medium. The computer program comprises: a first program for causing a computer to obtain measurement information regarding a plurality of measurement points on the wafer, wherein the measurement information includes at least positions of the measurement points on the wafer, the position of each measurement point being expressed by coordinates in a wafer coordinate system defined on the wafer; and a second program for causing the computer to determine a position of each measurement point on the wafer mounted on the stage on the basis of the measurement information.

These and other objects, features, aspects, and advantages of the present invention will become more apparent from the following detailed description of the preferred embodiments with the accompanying drawings.

BRIEF DESCRIPTION OF THE DRAWINGS

FIGS. 3(A) and 3(B) show outline of the positioning process in the embodiment;

FIGS. 12(A-1), 12(A-2), 12(B-1), 12(B-2) and 12(C) show an image processing method with a Sobel operator;

FIGS. 17(A) through 17(C) show registration of a template image MPa;

FIG. 19 shows view fields Wa and Wb of the image captured in the vicinity of a first scribe line intersection and a second scribe line intersection;

FIGS. 26(A) through 26(C) show a method of pattern matching with respect to the target wafer;

FIGS. 28($a$) through 28($d$) show the possible relations between a reference point Qd of a matching pattern MPd and a first scribe line intersection Pd on the target wafer;

FIG. 29 is a flowchart showing a routine of fine alignment with the target wafer.

DESCRIPTION OF THE PREFERRED EMBODIMENT

A. Apparatus Structure

Figure 1:
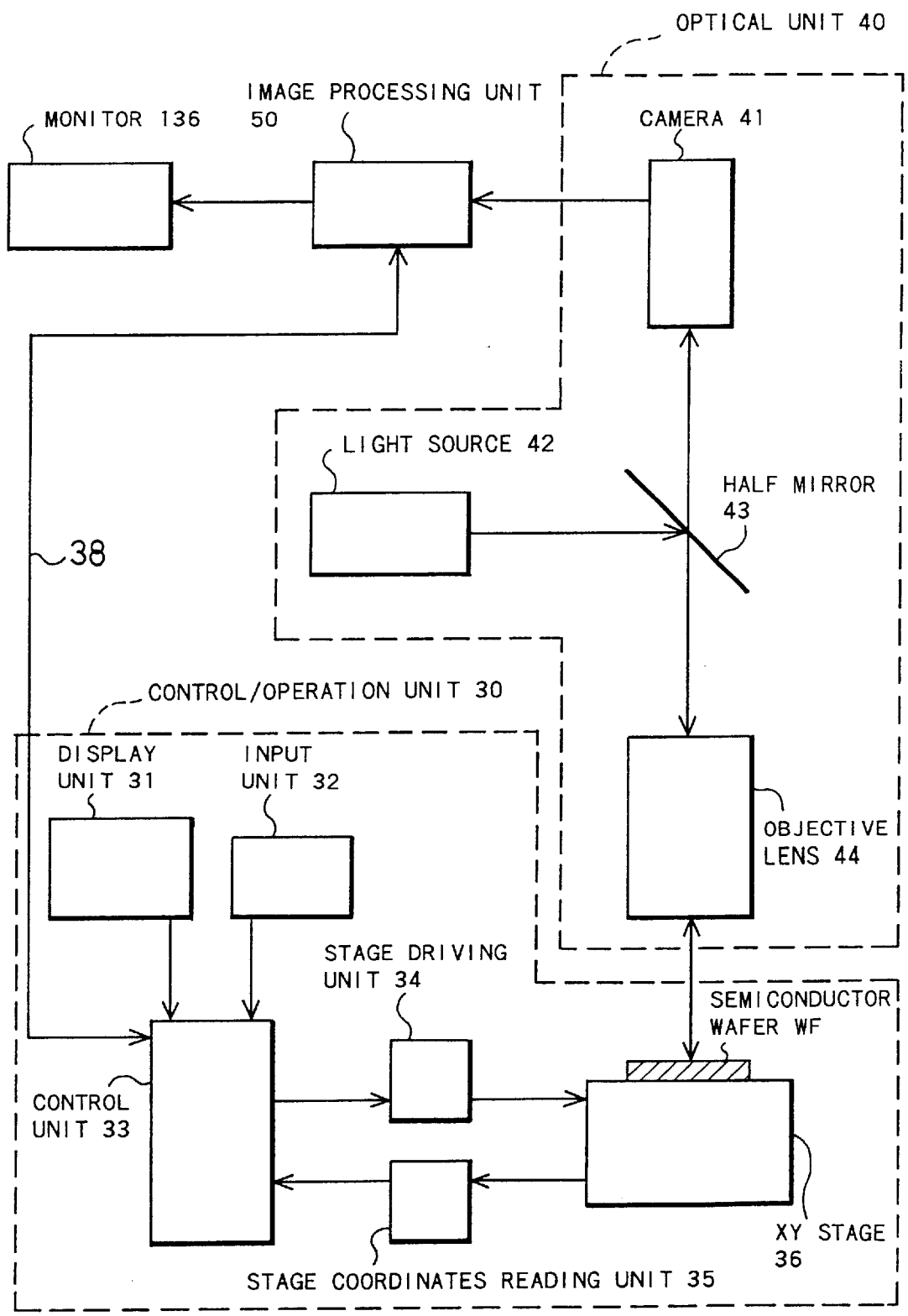
FIG. 1 is a block diagram illustrating the structure of a measurement device having the function of positioning a semiconductor wafer according to the present invention.

FIG. 1 is a block diagram illustrating the structure of a measurement apparatus embodying the present invention. The apparatus has an alignment function of positioning a semiconductor wafer described later. The apparatus includes a control/operation unit 30, an optical unit 40 as an image pickup optical system, and an image processing unit 50.

The control/operation unit 30 includes a display unit 31, an input unit 32, a control unit 33, a stage driving unit 34, a stage coordinates reading unit 35, and an XY stage 36. Available examples of the display unit 31 include a CRT monitor and a liquid crystal display. Available examples of the input unit 32 include a keyboard and a mouse. A semiconductor wafer WF is mounted on the XY stage 36. A plurality of rectangular semiconductor chips arranged like tiles are formed on the surface of the semiconductor wafer WF. This apparatus does not have a function of rotating the XY stage 36.

The optical unit 40 includes a camera 41, a light source 42, a half mirror 43, and an objective lens 44. The half mirror 43 reflects a light beam emitted from the light source 42 toward the objective lens 44, so that the semiconductor wafer WF on the XY stage 36 is irradiated with the reflected light beam. The light beam reflected from the surface of the semiconductor wafer WF passes through the objective lens 44 and the half mirror 43 and enters the camera 41. The camera 41 thus captures an image of the surface of the semiconductor wafer WF. The preferable image captured by the camera 41 is a multi-tone image (gray image). In this embodiment, the size of the view field of the camera 41 is smaller than the size of one semiconductor chip formed on the surface of the semiconductor wafer. As described later in detail, the multi-tone image of the semiconductor wafer WF is processed by the image processing unit 50. This results in detecting the orientation of the semiconductor wafer WF. A multi-tone image of a captured area that is part of the semiconductor wafer WF is displayed on a monitor 136 of the image processing unit 50.

When the user operates the input unit 32 and inputs an instruction to move the XY stage 36, the control unit 33 controls the stage driving unit 34 in response to the instruction and moves the XY stage 36 in both X and Y directions. When an instruction is given to read the coordinates of the stage via the input unit 32, the stage coordinates reading unit 35 reads the coordinates of the stage at the moment and supplies the coordinate information to the control unit 33. The stage coordinate information is displayed on the display unit 31 according to the requirements. The stage coordinate information is also supplied from the control unit 33 to the image processing unit 50 via a bi-directional communication path 38. The image processing unit 50 precisely determines the orientation and measurement positions of the wafer by taking advantage of the orientation of the wafer recognized through the image processing and the stage coordinate information.

Figure 2:
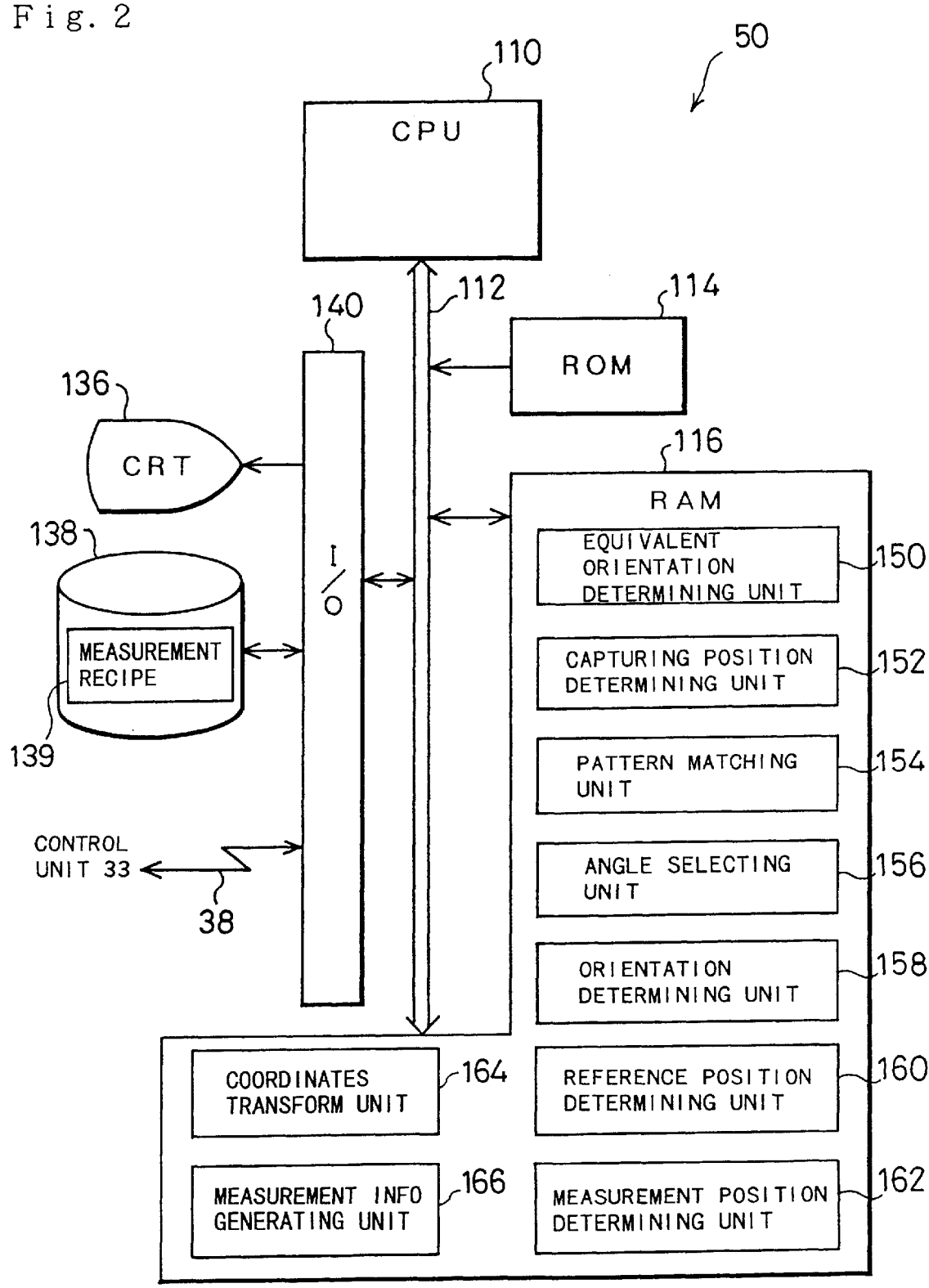
FIG. 2 is a block diagram illustrating the internal structure of an image processing unit 50.

FIG. 2 is a block diagram illustrating the internal structure of the image processing unit 50. The image processing unit 50 includes CPU 110, ROM 114, RAM 116, and an input/output interface 140, which are constructed as a computer system connected to a bus line 112. The monitor 136, a magnetic disk 138, and the communication path 38 are connected to the input/output interface 140.

RAM 116 stores applications programs that implement the functions of various units: an equivalent orientation determining unit 150, a capturing position determining unit 152, a pattern matching unit 154, an angle selecting unit 156, an orientation determining unit 158, a reference position determining unit 160, a measurement position determining unit 162, a coordinates transformation unit 164, and a measurement information generating unit 166. The functions of these units will be described later.

The computer programs for implementing the respective functions of these units are stored on a computer readable medium, such as floppy disks and CD-ROMs, and transferred from the computer readable medium to an external storage device or a main memory of the computer system. These programs are stored in the RAM 116 during the execution. Alternatively the computer programs may be supplied from a program supply device to the computer system via the communication path. In the specification hereof, the computer system includes hardware and an operating system and implies an apparatus working under the control of the operating system. The applications programs cause such a computer system to implement the functions of the respective units mentioned above. Part of these functions may be implemented not by the applications programs but by the operating system.

B. Outline of Positioning Process

FIGS. 3(A) and 3(B) show outline of the positioning process carried out in the embodiment. A reference wafer (FIG. 3(A)) has a pattern identical with the pattern formed on a target wafer (FIG. 3(B)), which is an object of the positioning process. In a general procedure, one wafer among a plurality of wafers, which have been processed in the same lot, is used as a reference wafer WF1 and another wafer as a target wafer WF 2. A positioning reference point RP and a plurality of measurement points PM1–PM15 (shown by open circles) are set on each wafer. As shown in FIGS. 3(A) and 3(B), it is assumed that the wafer mounted on the XY stage 36 can have an arbitrary orientation. It is possible that a wafer feeding device (not shown) can put the wafer onto the XY stage 36 so that a notch NT of the wafer mounted on the XY stage 36 is in a predetermined direction (for example, the direction of 6 o'clock). Even in this case, however, the orientation of the wafer may not be adjusted precisely but the wafer may be mounted somewhat inclined from the predetermined direction on the XY stage 36. This embodiment accordingly assumes that the wafer may have an arbitrary orientation. Since the measurement device shown in FIG. 1 does not have a rotating mechanism that is used to rotate the wafer mounted on the XY stage 36, the orientation of the wafer is recognized and corrected by image processing.

Figure 4:
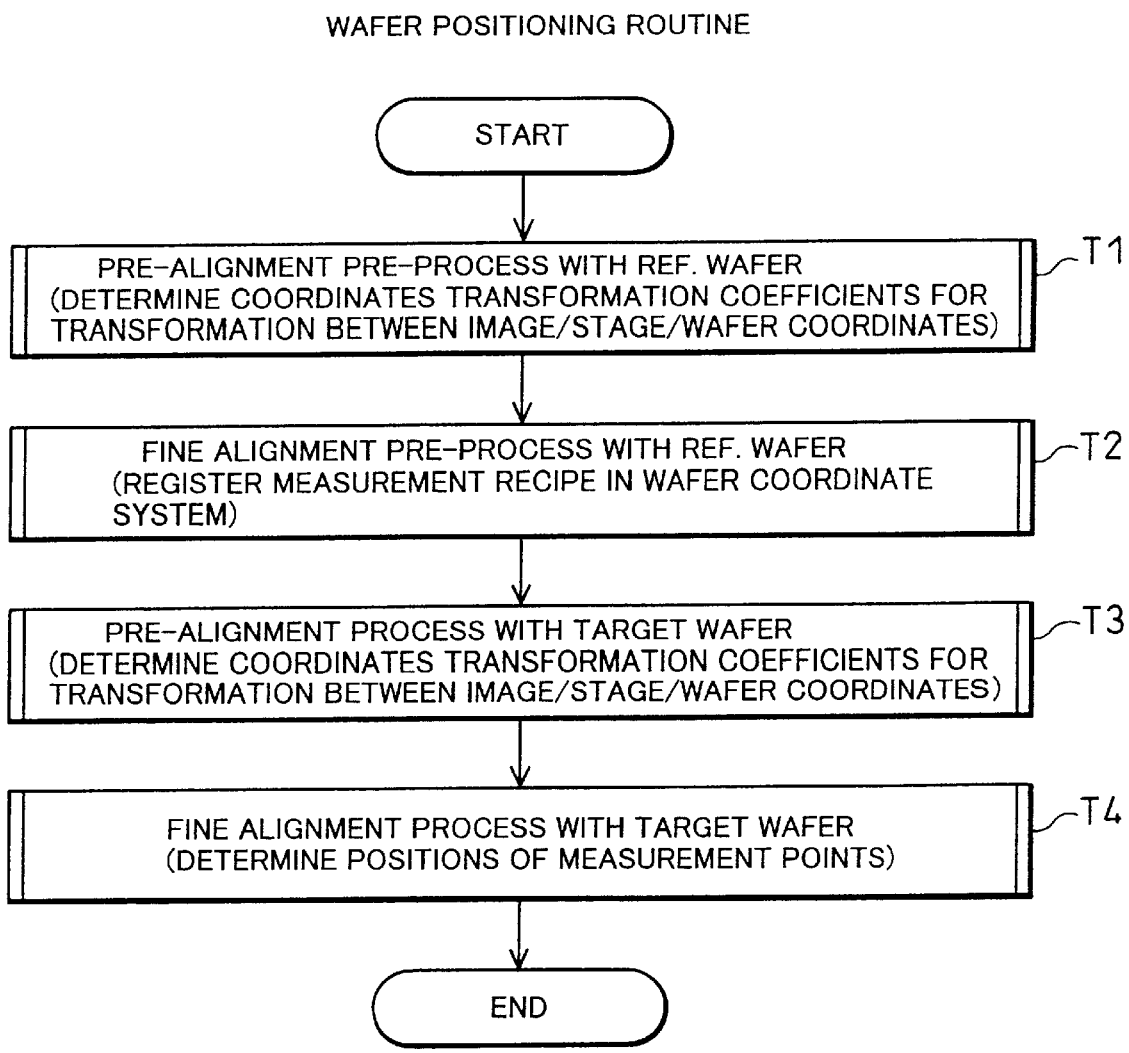
FIG. 4 is a flowchart showing a general routine of the positioning process in the embodiment.

FIG. 4 is a flowchart showing a general routine of the positioning process in the embodiment. The routine includes a pre-alignment pre-process with a reference wafer (step T1), a fine alignment pre-process with the reference wafer (step T2), a pre-alignment process with a target wafer (step T3), and a fine alignment process with the target wafer (step T4). The pre-alignment process at steps T1 and T3 is executed with the aid of the units 150, 152, 154, 156, 158, and 164 other than the measurement position determining unit 162 under the control of the reference position determining unit 160 (FIG. 2). The fine alignment process at steps T2 and T4 is executed with the aid of the capturing position determination unit 152, the pattern matching unit 154, and the coordinates transformation unit 164 under the control of the measurement position determining unit 162.

The pre-alignment pre-process with the reference wafer WF1 at step T1 in FIG. 4 determines coordinates transform coefficients for transformation between image coordinates and stage coordinates and coordinates transform coefficients for transformation between wafer coordinates and stage coordinates. The term "image coordinates" here denotes coordinates in an image coordinate system defined in an area of a captured image that is captured by the image pickup optical system or optical unit 40. The term "stage coordinates" here denotes coordinates in a stage coordinate system defined on the XY stage 36. The term "wafer coordinates" here denotes coordinates in a wafer coordinate system defined on the wafer.

The coordinates transform coefficients for the transformation between wafer coordinates and stage coordinates are determined according to a rotation angle $\theta 1$ of the reference wafer WF1 mounted on the XY stage 36 and stage coordinates of the positioning reference point RP (FIG. 3(A)). The rotation angle $\theta 1$ of the reference wafer WF1 is an angle between a reference direction D1 of the reference wafer WF1 and a reference direction Ds of the stage coordinate system. The reference direction Ds of the stage coordinate system is fixed to the XY stage 36 and is, for example, set to the X direction (the direction of 3 o'clock) on the XY stage 36. The reference direction D1 of the reference wafer WF1 is fixed to the reference wafer WF1 and is, for example, set to the direction of 3 o'clock when the notch NT of the reference wafer WF1 is put in the direction of 6 o'clock. These reference directions Ds and D1 may be set arbitrarily and are not restricted to these examples.

The fine alignment pre-process with the reference wafer WF1 at step T2 registers a measurement recipe 139, which includes positions of the plurality of measurement points PM1–PM15 on the reference wafer WF1 and measurement conditions for the respective measurement points PM1–PM15. The position of each measurement point is registered as coordinates in the wafer coordinate system. The measurement recipe 139 including various pieces of information specified at steps T1 and T2 is created by the measurement information generating unit 166 and stored into the magnetic disk 138.

Steps T3 and T4 are pre-alignment process and fine alignment process with the target wafer WF2, respectively. Like step T1, the pre-alignment process at step T3 determines coordinates transform coefficients for transformation between image coordinates and stage coordinates and coordinates transform coefficients for transformation between wafer coordinates and stage coordinates. The fine alignment process at step T4 determines positions of the respective measurement points according to the measurement recipe 139 and carries out measurement at the respective measurement point.

The same measurement device as that used at steps T1 and T2 or alternatively a different measurement device from that used at steps T1 and T2 may be used in the processing of steps T3 and T4 with respect to the target wafer WF2. If the same measurement device is used, the coordinates transform coefficients for the transformation between image coordinates and stage coordinates determined at step T1 can be used at step T3. Since it is assumed that the target wafer WF2 may have an arbitrary orientation as shown in FIG. 3(B), however, the coordinates transform coefficients for the transformation between wafer coordinates and stage coordinates are determined again at step T3.

If a different measurement device from that used at steps T1 and T2 is used in steps T3 and T4, on the other hand, the same processing as that of step T1 is executed at step T3 to determine both the coordinates transform coefficients for the transformation between image coordinates and stage coordinates and the coordinates transform coefficients for the transformation between wafer coordinates and stage coordinates. In this case, the measurement device used in the processing of steps T1 and T2 with the reference wafer WF1 (the first wafer) is referred to as the "first measurement device", whereas the measurement device used in the processing of steps T3 and T4 with the target wafer WF2 (the second wafer) is referred to as the "second measurement device". The first and the second measurement devices may have an identical structure or different structures.

C. Pre-alignment Pre-process with Reference Wafer

FIGS. 5 through 8 are flowcharts showing a routine of the pre-alignment pre-process with the reference wafer WF1. At step T1 of FIG. 5, an image rotation angle β1 of the reference wafer WF1 is determined. As described below, the image captured by the optical unit 40 is rotated by the image rotation angle β1, so as to yield an upright image.

Figure 6:
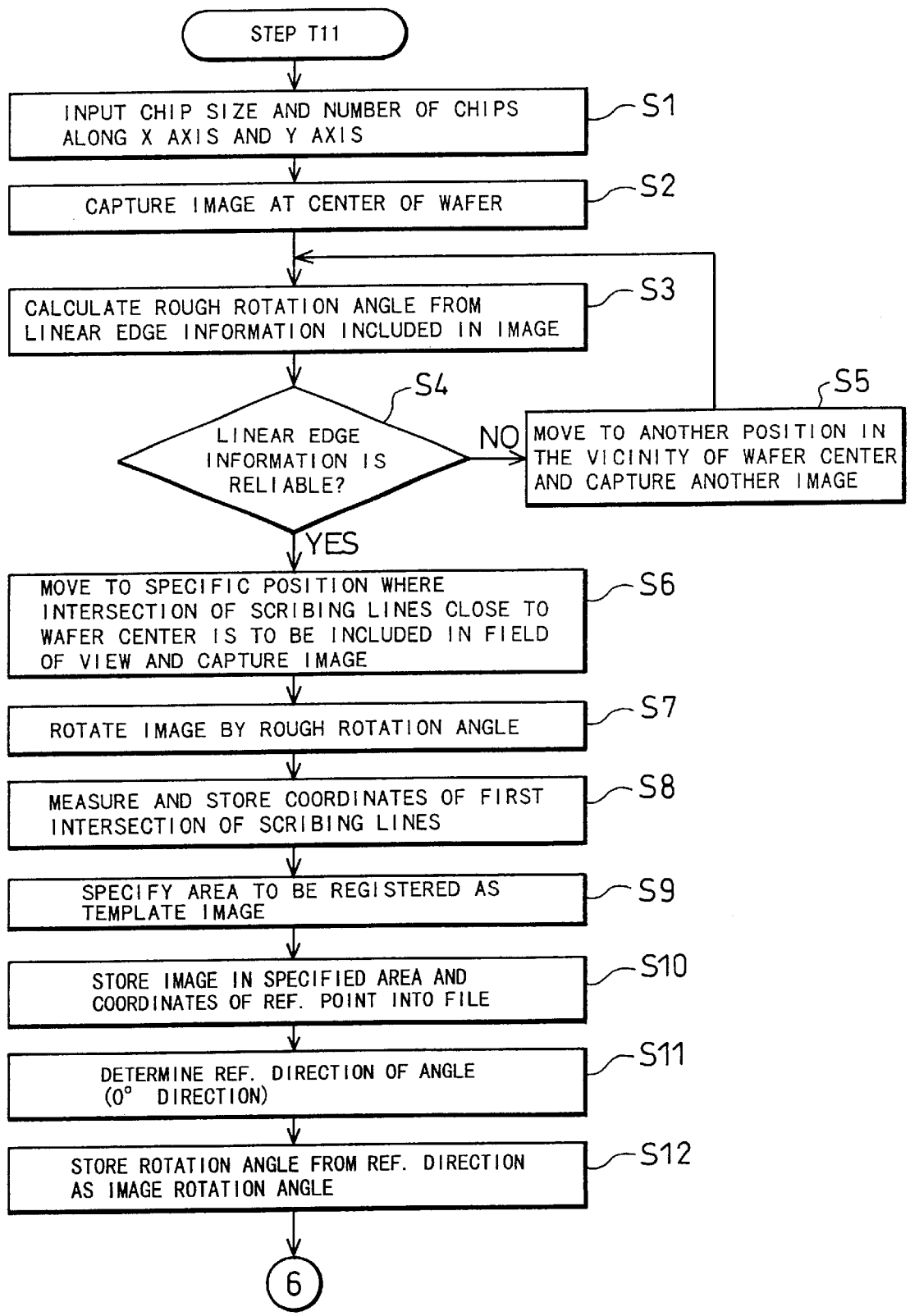
FIG. 6 is a flowchart showing the details of step T11 of FIG. 5 to determine an image rotation angle β1 of the wafer.

FIG. 6 is a flowchart showing details of the processing at step T11. At step S1, the user inputs dimensions of each chip on the wafer, the number of chips in the X-axis direction, and the number of chips in the Y-axis direction.

Figure 9A:
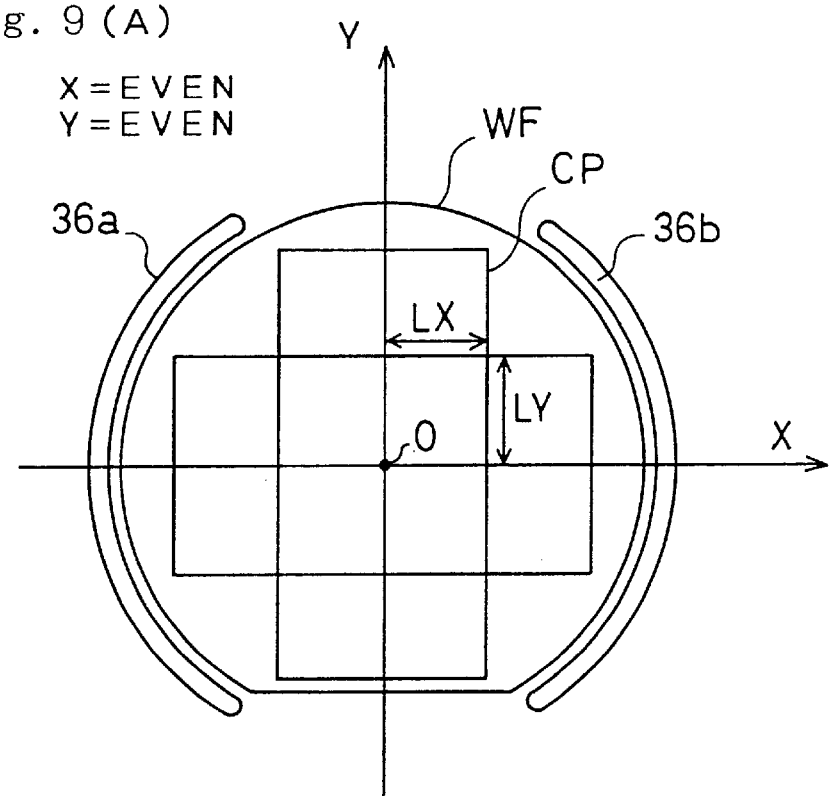
FIGS. 9(A) and 9(B) show possible arrangements of a plurality of chips formed in the semiconductor wafer WF.
Figure 9B:
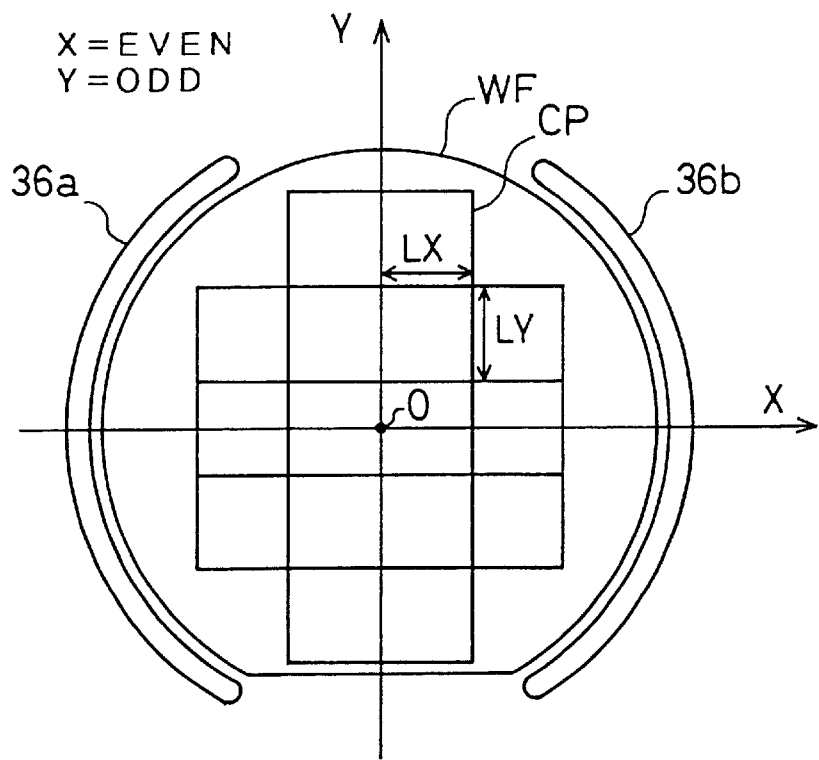

FIGS. 9(A) and 9(B) conceptually show an arrangement of chips formed on the surface of the semiconductor wafer. A plurality of rectangular chips CP of an identical size are arranged like tiles on the surface of the semiconductor wafer WF. There are four possible even-odd combinations regarding the number of chips along the X axis and the Y axis; that is, even-even, odd-even, even-odd, and odd-odd. FIG. 9(A) shows an example of the even-even combination, and FIG. 9(B) shows an example of the even-odd combination. The positions of chips in the vicinity of a center O of the wafer are calculated from the information indicative of one of the four possible combinations and vertical and lateral pitches LX and LY of each chip. At least the information indicative of one of the four possible combinations regarding the number of chips and the information representing the pitches LX and LY of each chip are accordingly input at step S1.

At step S2 of FIG. 6, the camera 41 captures a multi-tone image (gray image) on the center of the reference wafer WF1. When the wafer is mounted on the XY stage 36, a pair of wafer support arms 36a and 36b of the XY stage 36 support the periphery of the wafer and position the wafer on the substantial center of the XY stage 36 as shown in FIGS. 9(A) and 9(B). Image capturing with the camera 41 in this state gives an image in the vicinity of the center of the wafer.

Figure 10:
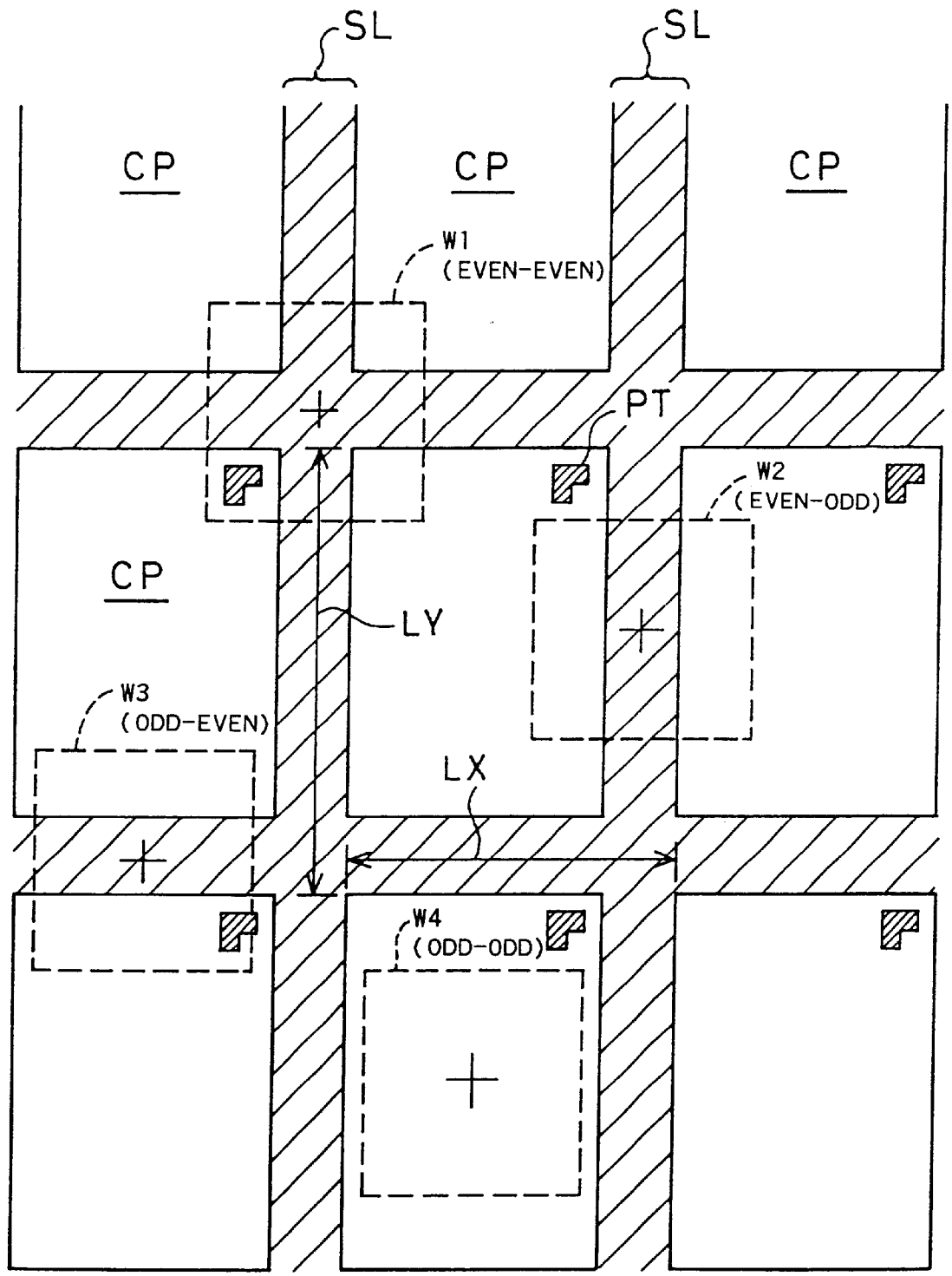
FIG. 10 shows a central portion of the wafer.

FIG. 10 is an enlarged view showing the center portion of the wafer. In this embodiment, it is assumed that a characteristic pattern PT is formed only on an upper right corner of each chip CP. An image segment including the characteristic pattern PT is used as the first template image in the pattern matching process described later. The chips CP are parted by scribing lines SL that run perpendicular to one another. In the multi-tone image of the surface of the wafer, the scribing lines SL may be identified as dark areas or otherwise as light areas. In any case, the scribing lines SL are distinguishable from the chips CP as the areas having different lightness.

In the drawing of FIG. 10, four view fields W1–W4 of the camera 41 are illustrated corresponding to the four possible combinations regarding the number of chips. As mentioned previously, the size of the view field of the camera 41 is smaller than the size of one chip, and a whole chip can accordingly not be included in the view field. The first view field W1 corresponds to a capturing area on the center of the wafer in case that the numbers of chips are of the even-even combination. This view field W1 is located on the substantial center of an intersection of scribing lines SL. The second view field W2 corresponds to a capturing area on the center of the wafer in case that the numbers of chips are of the even-odd combination. This view field W2 is located between two chips. The third view field W3 corresponds to a capturing area on the center of the wafer in case that the numbers of chips are of the odd-even combination. This view field W3 is also located between two chips. The fourth view field W4 corresponds to a capturing area on the center of the wafer in case that the numbers of chips are of the odd-odd combination. This view field W4 is located on the substantial center of a chip. Since the reference wafer WF1 is actually rotated from the position of FIG. 10, the view fields W1–W4 are inclined from the normal direction of the scribing lines SL.

Referring back to the flowchart of FIG. 6, the process at step S2 captures an image on the center of the wafer and thereby obtains an image at the position of one of the view fields W1–W4 shown in FIG. 10. This image is used for detecting a linear portion (for example, the scribing line SL) included in the image at subsequent step S3. If the numbers of chips is of the odd-odd combination, it is highly probable that the image includes no linear portion as is the case with the fourth view field W4 shown in FIG. 10. In this case, an image may be taken at a position shifted from the center of the wafer by half the pitch LX or LY of the chip.

At step S3 of FIG. 6, the equivalent orientation determining unit 150 (see FIG. 2) detects linear edge information included in the image and determines a rough rotation angle of the reference wafer based on the linear edge information. The "rough rotation angle" denotes a rotation angle of relatively low precision obtained from the linear edge information. Extraction of the linear edge information may be executed by the one-dimensional projection method or the Sobel operators method described below.

Figure 11:
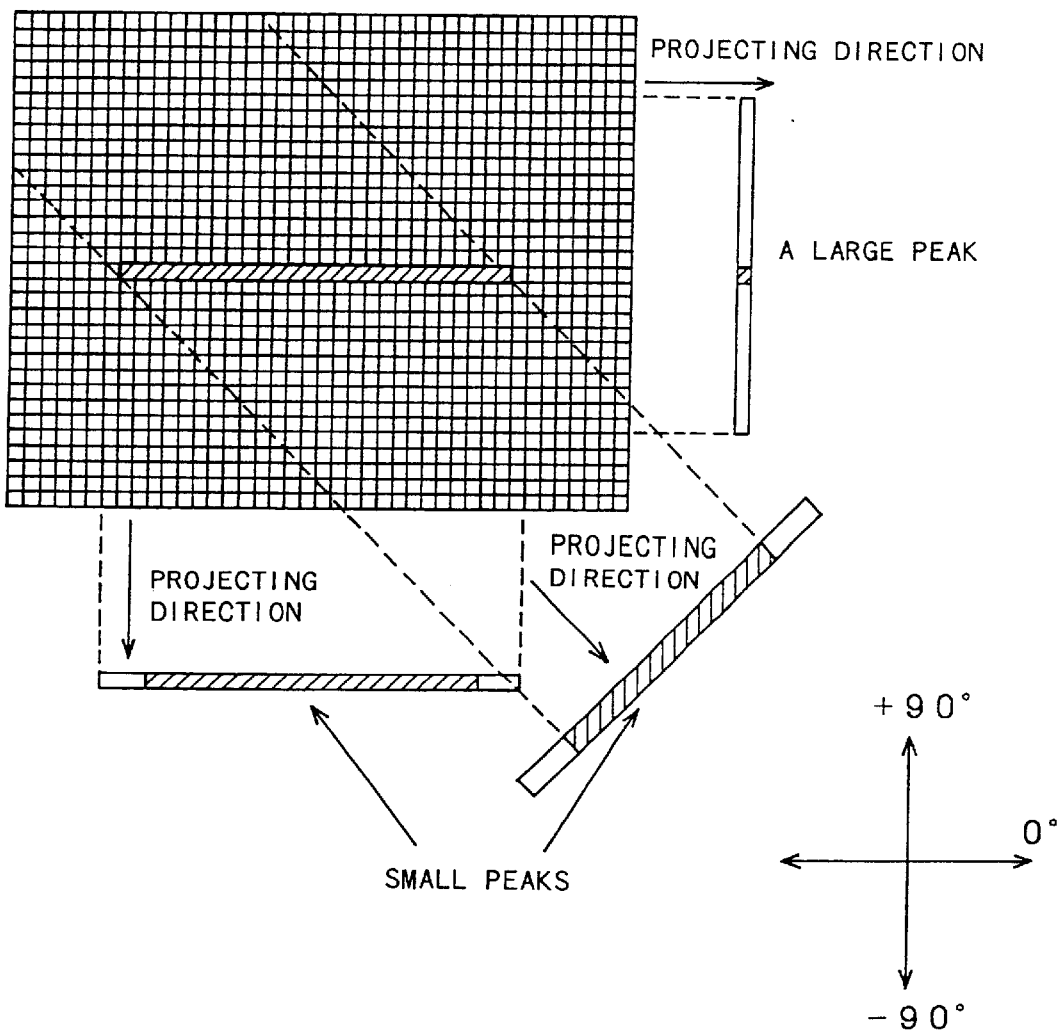
FIG. 11 shows a process of detecting line edge information by the one-dimensional projection method.

FIG. 11 shows a process of detecting the linear edge information by the one-dimensional projection method. A two-dimensional multi-tone image having a linear portion only in the horizontal direction is shown in the example of FIG. 11. The one-dimensional projection method projects the two-dimensional multi-tone image one-dimensionally in a variety of directions and sums up the pixel values. In case of the projection in the direction parallel to the linear portion, the accumulated pixel value reaches a large peak at the coordinate where the linear portion exists. In case of the projection in the direction not parallel to the linear portion, on the other hand, the sum of the pixel values has a smaller peak. The two-dimensional image is one-dimensionally projected in a variety of directions in this manner, and the direction of projection in which the sum of the pixel values has a maximum peak, is determined as the direction of the linear portion. A plurality of projecting directions are selected in the range of 180°. The rough rotation angle is determined according to the direction of the linear portion. By way of example, a predetermined direction (for example, the direction of three o'clock) in the stage coordinate system (the coordinate system fixed to the XY stage 36) is set as a reference direction, and the angle measured counterclockwise from the reference direction to the direction of the linear portion is defined as the rough rotation angle.

FIGS. 12(A-1) through 14(B) show a process of detecting the linear edge information by the Sobel operators method. FIGS. 12(A-1), 12(A-2), 12(B-1), 12(B-2) and 12(C) show an image processing method with Sobel operators. The Sobel operators method first selects a pixel block of a predetermined size (3×3 block for example) including an edge pixel out of the multi-tone image as shown in FIG. 12(A-1) or 12(A-2). Here the 'edge pixel' is defined as a 'pixel (center pixel in FIGS. 12(A-1) and 12(A-2)) that has a pixel value different from that of at least one of the eight proximate pixels and does not exist on the boundary of an image'. In the example of FIG. 12(A-1), a pixel in a corner portion of an image is recognized as the edge pixel. In the example of FIG. 12(A-2), a pixel in a linear portion is recognized as the edge pixel. The edge pixel is identified by scanning the 3×3 block in the multi-tone image and determining whether or not the center pixel in the block meets the above definition.

FIGS. 12(B-1) and 12(B-2) show Sobel operators in the horizontal and vertical directions. A horizontal edge value and a vertical edge value are determined by carrying out an operation on the 3×3 block including the edge pixel with the horizontal operator and the vertical operator, respectively. FIG. 12(C) shows an example of such an operation with the horizontal operator. Summing up the multiplication of the pixel values of 3×3 block by the respective values of the horizontal operator gives a horizontal edge value. In a similar manner, summing up the multiplication of the pixel values of 3×3 block by the respective values of the vertical operator gives a vertical edge value.

Figures 13A, 13B, 13C:
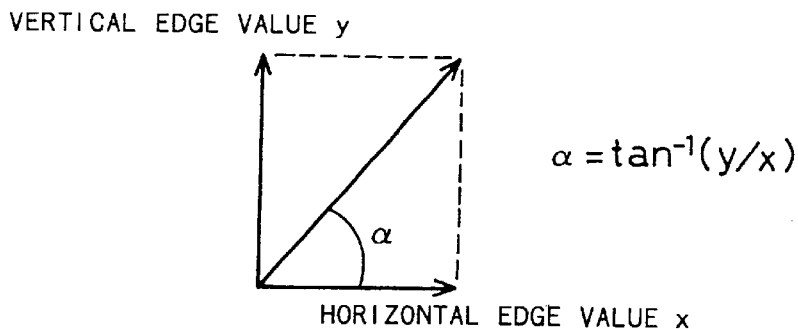
FIGS. 13(A) through 13(C) show a process of calculating the angle of a line segment of the image from a horizontal edge value and a vertical edge value obtained with the Sobel operator.

FIGS. 13(A)–13(C) show a process of calculating the angle of the linear portion of the image based on the horizontal edge value x and the vertical edge value y obtained through the operation with the Sobel operators. Referring to FIG. 13(A), the angle α of the linear portion of the image is given by $\tan^{-1}(y/x)$. Here the angle a denotes an angle measured counterclockwise from the horizontal rightward direction (that is, the direction of 3 o'clock). In the example of FIG. 13(B), the vertical edge value is equal to 0 while the horizontal edge value is equal to 4, the calculated angle α is equal to 0° accordingly. In the example of FIG. 13(C), both the vertical edge value and the horizontal edge value are equal to 1, and the calculated angle α is thus equal to 45°. The angle α ranges from 0° to 180°. The range of 180° to 360° is equivalent to the range of 0° to 180°.

Figures 14A, 14B:
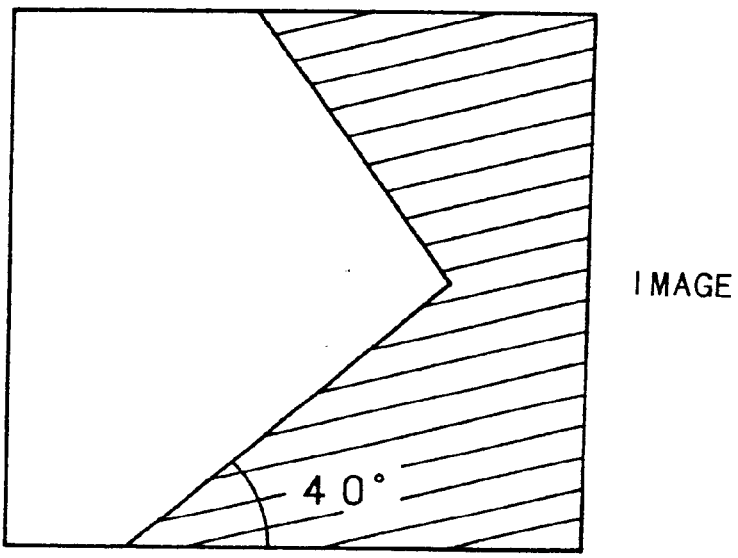
FIGS. 14(A) and 14(B) respectively show an exemplified multi-tone image to be processed and a histogram of the angle detected in the multi-tone image by the Sobel operator method.

FIGS. 14(A) and 14(B) show a multi-tone image to be processed and a histogram of the angle a detected from the multi-tone image by the Sobel operators method. In the multi-tone image shown in FIG. 14(A), 3×3 blocks, each including an edge pixel as its center pixel as shown in FIG. 12(A-1) or FIG. 12(A-2), are extracted and the angle α is calculated for each 3×3 block including the edge pixel according to the method described with FIGS. 13(A)–13(C). FIG. 14(B) shows a histogram representing the frequency of the angle α obtained for a number of 3×3 blocks in this manner. In this example, peaks are found at 40° and 130°, and the largest peak is at 40°. An angle α1 at the largest peak is adopted as the rough rotation angle that represents the orientation of the linear portion in the multi-tone image.

Figure 15A:
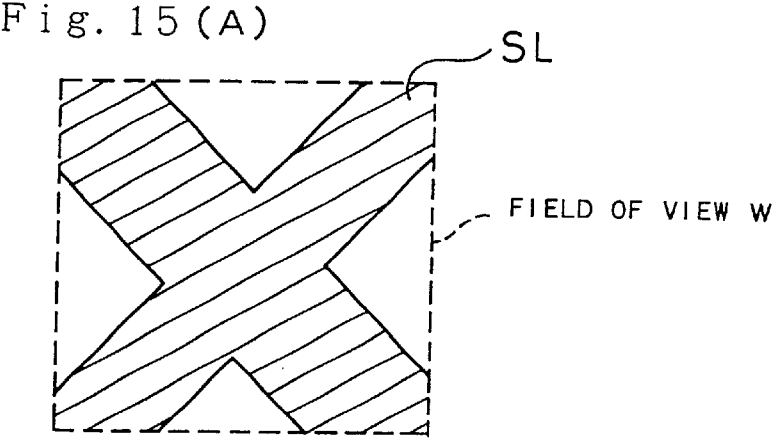
FIGS. 15(A) through 15(E) show four equivalent rotation angles.
Figure 15B:
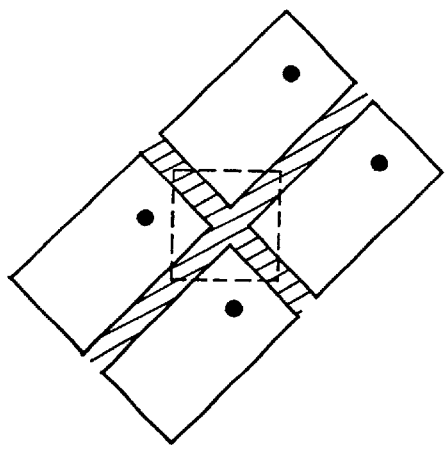
Figure 15C:
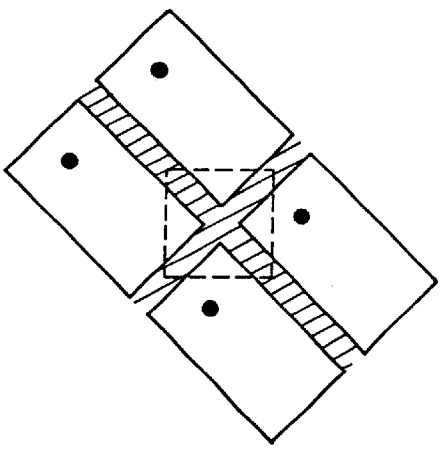
Figure 15D:
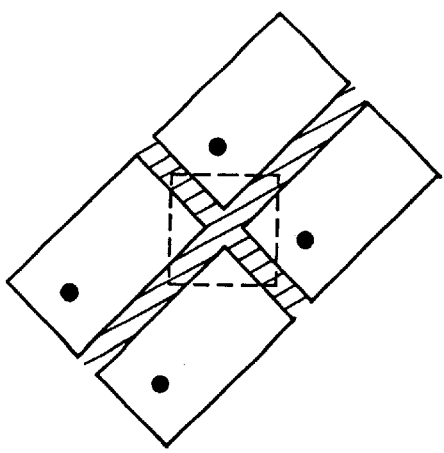
Figure 15E:
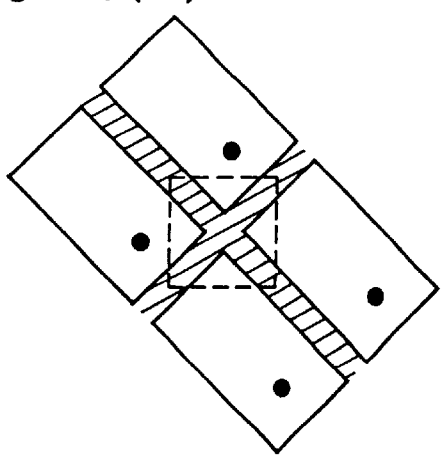

The rough rotation angle α1 detected by the one-dimensional projection method or the Sobel operators method has four equivalent angles that are different by integral multiples of 90°. In other words, the rough rotation angle al has a quadruple uncertainty. FIGS. 15(B)–15(E) show four equivalent rotation angles for an image of FIG. 15(A). It is assumed that an image in the vicinity of an intersection of scribing lines SL is in a view field W of the camera 41 as shown in FIG. 15(A). In this embodiment, since the size of the view field of the camera 41 is smaller than the size of one chip, it cannot be determined, based on the image data, which one of the four alternatives shown in FIGS. 15(B)–15(E) is the case with the orientation of the chip. The proper rotation angle of the wafer is one of the four equivalent rotation angles of 90° intervals. At step S3 of FIG. 6, at least one of these four equivalent rotation angles is detected as the rough rotation angle. It is fair assumption that detection of one equivalent rotation angle leads to detection of the other equivalent rotation angles.

In most cases, the linear edge information and the rough rotation angle thereof obtained at step S3 are related to the scribing line SL. Linear edge information and its rough rotation angle detected here are not restricted to the scribing lines SL, but they may be related to any linear image portion existing in the multi-tone image of the wafer. A linear portion included in a circuit in the chip is generally parallel to the scribing line SL. Detection of a linear image portion other than the scribing line SL thus results in obtaining the rough rotation angle of the wafer.

At step S4 of FIG. 6, it is determined whether or not the linear edge information obtained at step S3 is reliable. In case that the one-dimensional projection method shown in FIGS. 13(A)–13(C) is applied, the program determines whether or not the peak of the accumulated pixel value is not less than a predetermined threshold value. In case that the Sobel operators method shown in FIGS. 12(A-1) through 14(B) is applied, on the other hand, the program determines whether or not the peak value of the histogram shown in FIG. 14(B) is not less than a predetermined threshold value. Another possible method displays an image of the wafer on the monitor 136 and enables the user to observe the image and determine whether or not a distinct linear edge is included in the image. When the linear edge information is not reliable, the program proceeds to step S5, at which the XY stage 36 is shifted by a predetermined amount (for example, by one view field pitch) and a multi-tone image is taken at another position in the vicinity of the center of the wafer. The program then returns to step S3 to detect the linear edge information and obtain the rough rotation angle α1 again.

Figure 16:
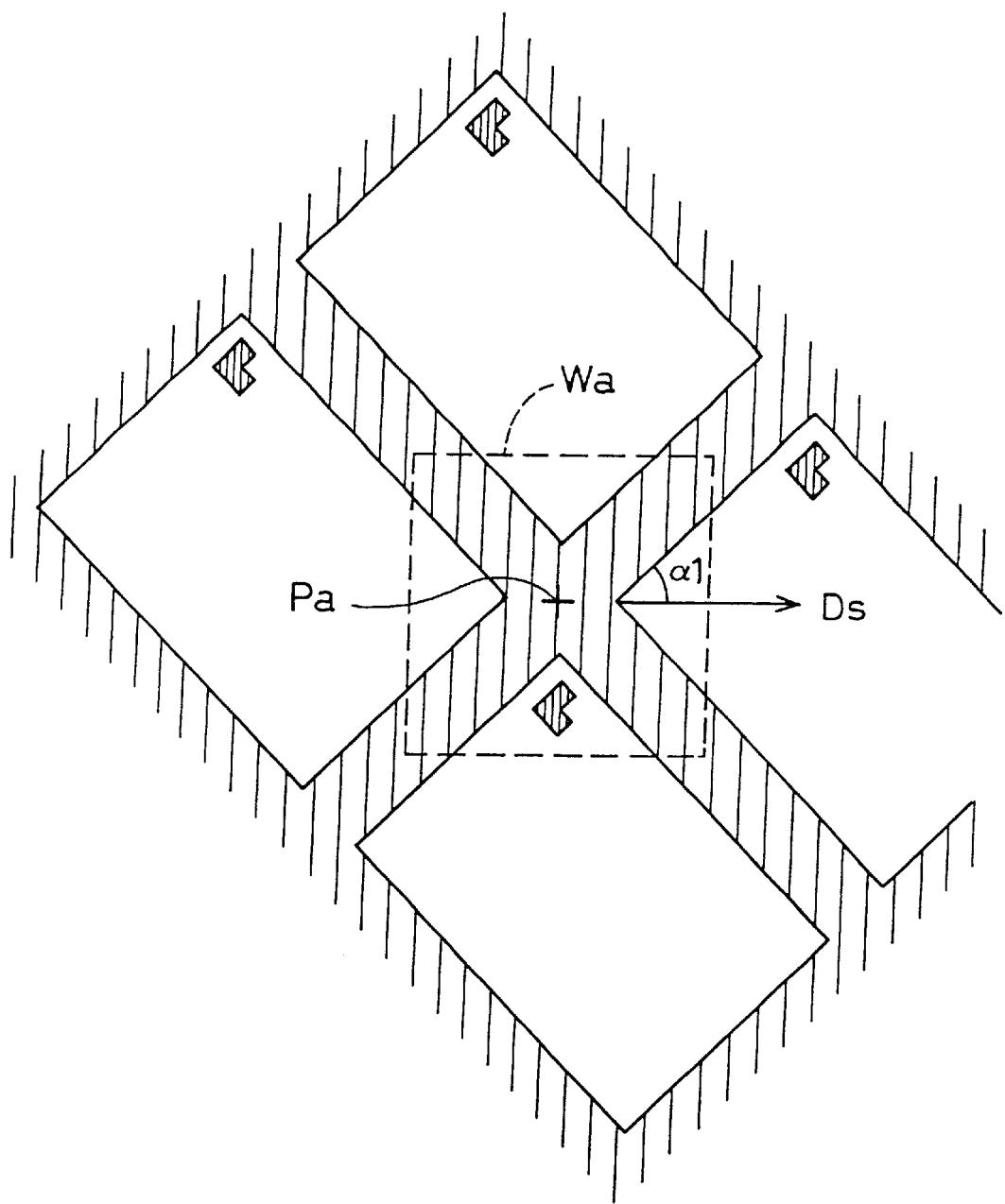
FIG. 16 shows the state in which the center of the view field is shifted to the position of the intersection of the scribe lines SL.

After the determination of the rough rotation angle α1, the capturing position determining unit 152 calculates coordinates of a target position of the XY stage 36 where the field of view will include an intersection of scribing lines SL in the vicinity of the center of the wafer. The unit 152 then shifts the XY stage 36 to the calculated coordinates at step S6. As described previously, the initial position of the view field on the center of the wafer is one of the four view fields W1–W4 shown in FIG. 10, depending on the four combinations of the number of chips along the X axis and the Y axis (even-even, even-odd, odd-even, or odd-odd). The capturing position determining unit 152 (see FIG. 2) calculates the distances to be shifted in the X direction and in the Y direction from the rough rotation angle α1 obtained at step S3, the size of the chip (pitches LX and LY), and the information on the number of chips, so that an intersection of scribing lines SL will be included in the field of view. The image processing unit 50 informs the control unit 33 (see FIG. 1) of the distances to be shifted, thereby moving the XY stage 36. The camera 41 then takes a multi-tone image again. Since the rough rotation angle α1 has the quadruple uncertainty, one shift may not allow the center of the view field to reach the intersection of scribing lines SL. In this case, the moving direction is changed, for example, to the direction rotated by 90° around the center position of the wafer, and the XY stage 36 is moved by the same distances. This enables the center of the view field (that is, the capturing area) to be moved to the intersection of scribing lines SL. FIG. 16 shows the state in which the center of the view field is moved to an intersection of scribing lines SL. Referring to FIG. 16, the direction of a linear portion (scribing line SL) of the wafer is inclined by the rough rotation angle α1 from the reference direction Ds in the stage coordinate system. At step S6, the image taken with the camera 41 is displayed on the monitor 136.

Referring back to the flowchart of FIG. 6, an image processing operation is carried out at step S7 to rotate the image taken at step S6 clockwise by the rough rotation angle α1. At subsequent step S8, the capturing position determining unit 152 obtains a measured value of the precise position (coordinates) of an intersection Pa of scribing lines SL, and stores the measured value. The coordinates at the intersection of scribing lines SL are used to determine a positioning reference point of the reference wafer WF1. The intersection of scribing lines SL on the reference wafer is, for example, represented by the coordinates at a center point Pa of a view field Wa of the camera 41 shown in FIG. 16. The user may specify the position of this point Pa by moving the cursor with a pointing device, such as a mouse, in the image displayed on the monitor 136. Another possible procedure processes a multi-tone image taken with the camera 41 and automatically determines the coordinates at the center the intersection of scribing lines SL. In case that the image processing is carried out to determine the center the intersection, the process first detects linear edges according to the method of step S3 described above and obtains straight lines approximating the edges of the scribing lines SL. The process then determines a center position of four corners defined by these approximate straight lines as the intersection of scribing lines SL.

The coordinates at the center position of the view field Wa are read by the stage coordinates reading unit 35 (see FIG. 1) as coordinate values in the stage coordinate system (coordinates fixed to the stage). Coordinate values of an arbitrary position in the field of view Wa (that is, in the captured image) in the stage coordinate system can be calculated readily from the coordinates of the center position and the relative position within the captured image.

The process at step S8 also measures an offset (δx, δy) of the stage coordinates of the scribe line intersection Pa from those of a reference point Qa of a first template image MPa.

At step S9 of FIG. 6, the first template image for pattern matching (also referred to as the model pattern) is cut out of the image which has been rotated at step S7, and registered. FIGS. 17(A)–17(C) show the registration of the first template image MPa. At step S7, the multi-tone image at the intersection of scribing lines SL (FIG. 17(A)) is rotated clockwise by the rough rotation angle α1 as shown in FIG. 17(B) and the rotated image is displayed on the monitor 136. Rotation of the image is implemented by affine transformation. The user observes the displayed image and determines whether or not an image pattern suitable as the template image MPa exists in the displayed image. The image pattern suitable for the template image MPa means an image pattern which will help to select one of the four equivalent rotation angles as the true value of the rough rotation angle α1 based on the direction of the image pattern. Image patterns without rotational symmetry of an integral multiple of 90° are preferable as the template image MPa. In other words, image patterns having rotational symmetry of an integral multiple of 90° (rotational symmetry of 90°, 180°, or 270°) are not suitable for the template image MPa. The respective corners of the adjoining four chips are included in the field of view Wa in the vicinity of the intersection of scribing lines SL. A characteristic image pattern included in only one of these four corners can thus be registered as the first template image MPa.

If there are no image portions suitable for the template image MPa in the current field of view Wa, the user gradually moves the XY stage 36 while observing the image taken with the camera 41 and displayed on the monitor 136, in order to make an image pattern usable as the template image MPa to come within the field of view.

In case that an image pattern suitable for the template image MPa exists in the current field of view Wa, on the other hand, an area registered as the template image MPa is cut out of the rotated image as shown in FIGS. 17(B) and 17(C). The user specifies the area of the template image MPa with a pointing device, such as a mouse. Although it is preferable that the template image MPa exists in the vicinity of the intersection of scribing lines SL, it may be at other positions.

The template image MPa is registered in an upright state in the measurement recipe 139. The "upright state" here means that each side of the rectangular area of the template image MPa is substantially parallel to or perpendicular to line edges in the image.

Step S10 of FIG. 6 stores the first template image MPa and stage coordinates of a reference point at a predetermined location in the template image Mpa (for example, an upper left point Qa in FIG. 17(C)) into the measurement recipe 139.

At subsequent step S1, the user specifies a predetermined direction (for example, the direction of 3 o'clock) of the template image Mpa to be used as a reference direction Dw1 (direction of 0 degree) of the captured image, so as to determine an image rotation angle β1. In the image rotated clockwise by a rough rotation angle α1, for example, the direction of 3 o'clock is specified as the reference direction Dw1 of the captured image as shown in FIG. 17(B). The reference direction Dw1 is close to the reference direction D1 shown in FIG. 3(A), but is different from the reference direction D1 by the rotation angle of the image pickup optical system described later. Another possible procedure does not require the user to specify the reference direction Dw1 but causes the direction of 3 o'clock to be automatically set as the reference direction Dw1. The image rotation angle β1 of the wafer denotes an angle measured from the reference direction Ds in the stage coordinate system to the reference direction Dw1 of the captured image. In the example of FIG. 17(B), the image rotation angle β1 is equal to the rough rotation angle α1. If a direction other than the direction of 3 o'clock is selected as the reference direction Dw1 of the captured image, the image rotation angle α1 is different from the rough rotation angle α1. In this case, the image rotation angle β1 is obtained by adding or subtracting a predetermined value to or from the rough rotation angle α1. For example, when the direction of 12 o'clock is selected as the reference direction Dw1 of the captured image in the state of FIG. 17(B), the image rotation angle β1 is equal to (α1+90°). Referring back to the flowchart of FIG. 6, the value of the image rotation angle β1 is stored into the measurement recipe 139 at step S12.

Since the image captured by the optical unit 40 has been rotated by the image rotation angle β1, the captured image is rotated by the image rotation angle β1 to be put in the upright state, and the subsequent processing is carried out for the upright image.

Figure 18:
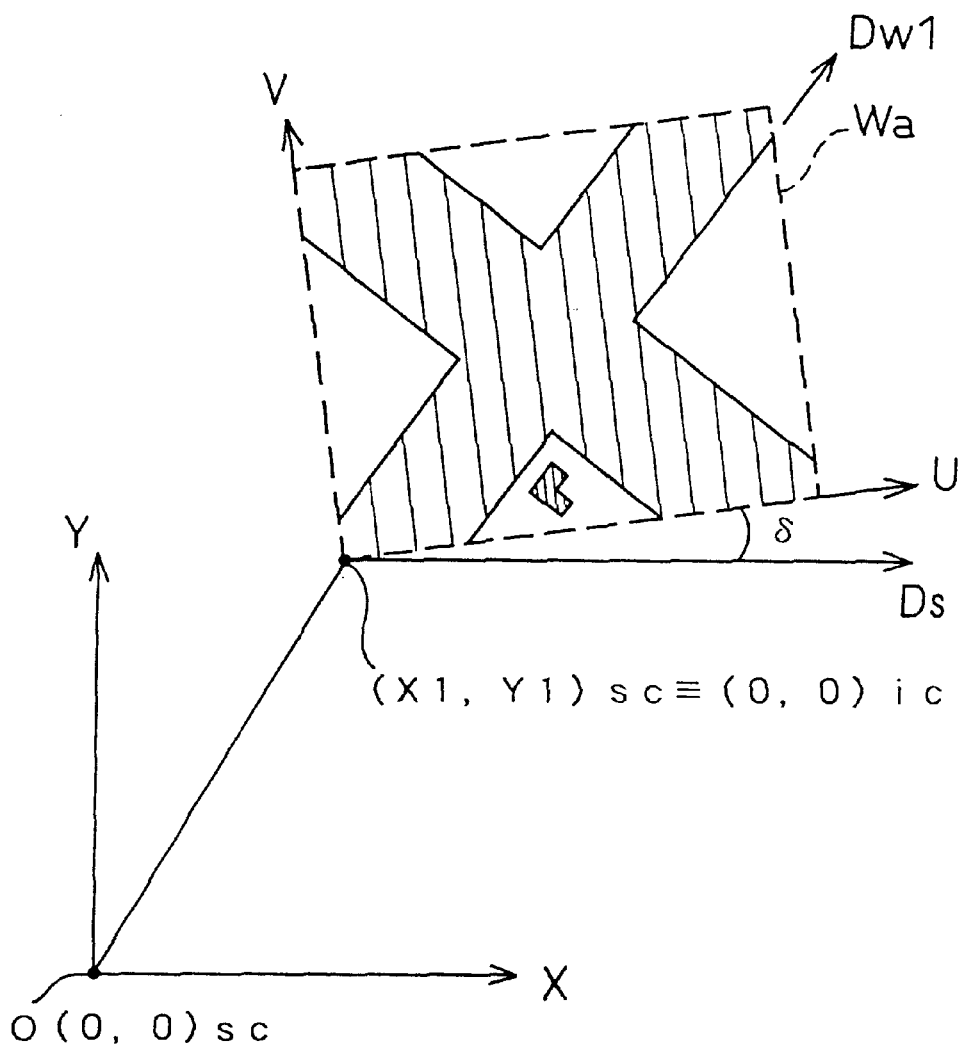
FIG. 18 shows the relationship between an image coordinate system and a stage coordinate system.

If the optical element (for example, the CCD camera 41) of the optical unit 40 is inclined to the stage coordinate system, the image coordinate system, which is defined in the image captured by the optical unit 40, is inclined to the stage coordinate system. FIG. 18 shows the relationship between coordinates (U, V)ic in the image coordinate system and coordinates (X, Y)sc in the stage coordinate system. The subscript "ic" indicates that the coordinates values are defined in the image coordinate system, and the subscript "sc" indicates that the coordinates values are defined in the stage coordinate system. The origin of the image coordinate system is set on a lower left point in a view field Wa, which has coordinates (X1, Y1)sc in the stage coordinate system. The coordinate axes U and V in the image coordinate system are rotated counterclockwise from the coordinate axes X and Y in the stage coordinate system by an angle δ. The angle δ is ascribed to, for example, the attachment error of the optical element of the optical unit 40, and is hereinafter referred to as the "rotation angle of the image pickup optical system". The transformation between the image coordinates (U,V)ic and the stage coordinates (X,Y)sc is carried out by two-dimensional affine transformation according to Equation 1:

$$[X \quad Y \quad 1] = [U \quad V \quad 1] \begin{bmatrix} \cos\delta & \sin\delta & 0 \\ -\sin\delta & \cos\delta & 0 \\ X1 & Y1 & 1 \end{bmatrix} \quad (1)$$

It is required to know the rotation angle δ of the image pickup optical system for accurate transformation of the image coordinates (U,V)ic into the stage coordinates (X,Y) sc. At step T12 of FIG. 5, the rotation angle δ of the image pickup optical system is measured.

Figure 7:
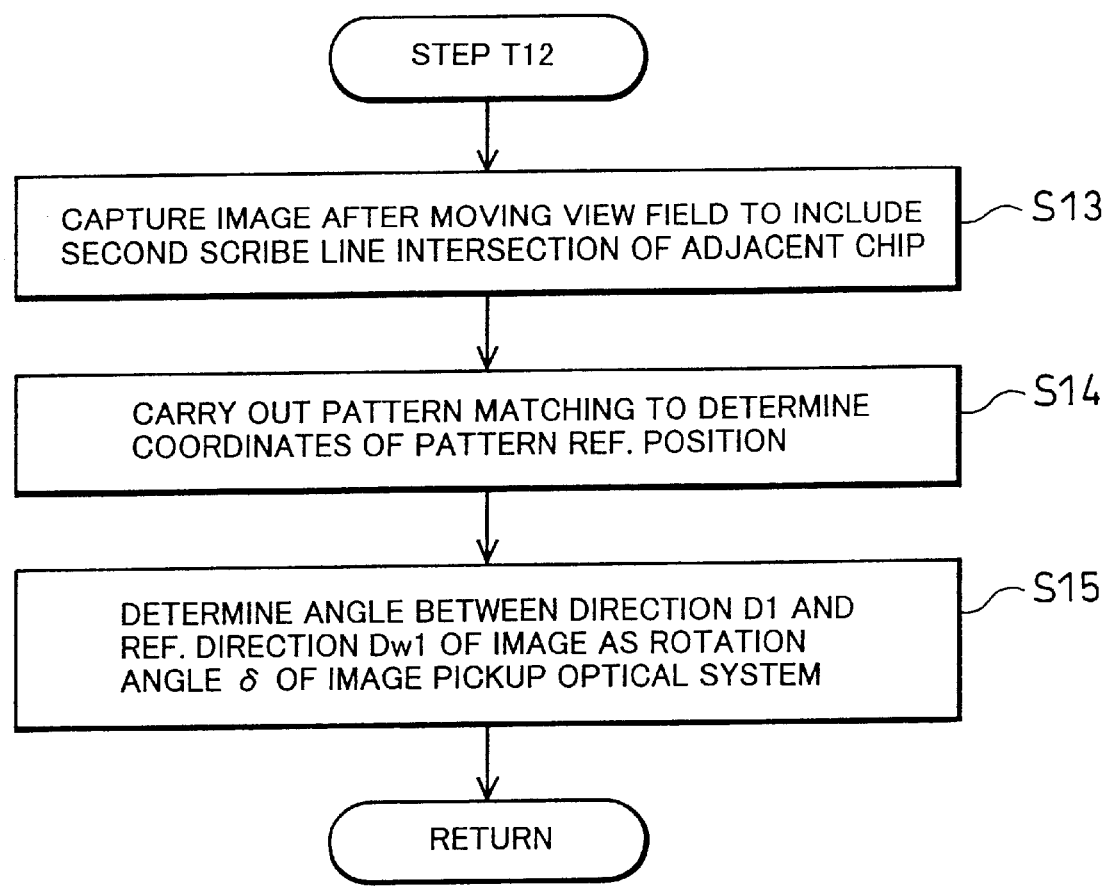
FIG. 7 is a flowchart showing the details of step T12 of FIG. 5 to determine a rotation angle δ of the shooting optical system.

FIG. 7 is a flowchart showing the details of the processing of step T12. At step S13, the XY stage 36 is moved along the reference direction Dw1 of the captured image, in order to locate the view field at the position of a second scribe line intersection that is adjacent to the first scribe line intersection, and an image is captured at that position. The XY stage 36 is controlled to move along the reference direction Dw1 of the captured image by the pitch LX in the X direction of the chip (see FIG. 9(A)). In the course of this movement, it is regarded that the reference direction Ds in the stage coordinate system coincides with the horizontal axis (U axis) of the image coordinate system (that is, it is assumed that the rotation angle δ is equal to zero). The stage is accordingly moved along the direction deviated from the reference direction Dw1 by the rotation angle δ of the image pickup optical system. The image captured at the position of the second scribe line intersection is then rotated by the image rotation angle β1 (see FIG. 17(B)) described previously.

FIG. 19 shows view fields Wa and Wb of the image captured in the vicinity of the first and second scribe line intersections. At step S14 of FIG. 7, pattern matching is carried out for the image captured in the vicinity of the second scribe line intersection, so as to detect an image pattern MPb that matches the first template image MPa. The process at step S14 also measures stage coordinates of a reference point Qb in the detected matching pattern MPb. Here it is assumed that the rotation angle δ of the image pickup optical system is equal to zero. The direction of a line segment that connects the reference points Qa and Qb of the two image patterns MPa and MPb with each other is specified as the accurate reference direction D1 of the reference wafer WF1. The reference direction D1 is identical with that shown in FIG. 3(A). The reference direction D1 of the wafer is determined according to the stage coordinates of the two reference points Qa and Qb, and thereby indicates the accurate reference direction of the wafer. The reference direction Dw1 of the captured image, which is determined according to the line edge of the image, is obtained on the assumption that the rotation angle δ of the image pickup optical system is 0 degree, and is thereby deviated from the accurate reference direction D1 by the rotation angle δ of the image pickup optical system. At step S15 of FIG. 7, the angle between the reference direction D1 of the wafer and the reference direction Dw1 of the captured image is calculated and determined as the rotation angle δ of the image pickup optical system.

The stage coordinates of the two reference points Qa and Qb are obtained on the assumption that the rotation angle δ of the image pickup optical system is 0 degree, and thereby include errors corresponding to the rotation angle δ. Since the errors in the coordinates of the two reference points Qa and Qb are both caused by the same rotation angle δ, the errors cancel each other in determining the reference direction D1 of the wafer. In other words, the reference direction D1 is determined accurately in spite of the errors.

An angle θ1 between the reference direction D1 of the wafer and the reference direction Ds of the stage coordinate system, shown in the lower portion of FIG. 19, represents the accurate rotation angle of the reference wafer WF1. The rotation angle θ1 of the wafer is the sum of the image rotation angle β1 and the rotation angle δ of the image pickup optical system. In other words, the image rotation angle β1 is obtained by subtracting the rotation angle δ of the image pickup optical system from the rotation angle θ1 of the wafer.

Image coordinates (U,V)ic of an arbitrary position in the captured image are transformed into stage coordinates (X,Y) sc using the rotation angle δ of the image pickup optical system according to Equation 1 given above. The stage coordinates (X,Y)sc can reversely transformed into the image coordinates (U,V)ic. The stage coordinates of the respective points obtained at steps T11 and T12 of FIG. 5 prior to the determination of the rotation angle δ of the image pickup optical system are recalculated from the image coordinates of the respective points according to Equation 1.

Figure 5:
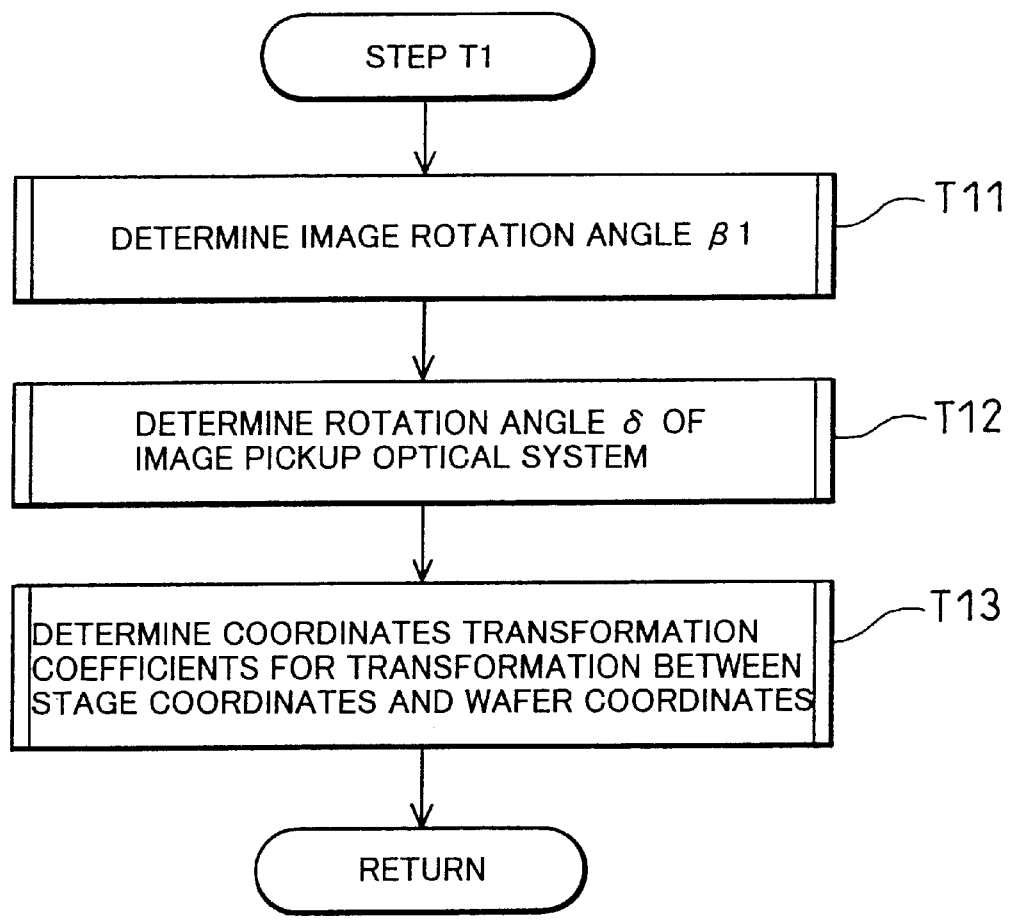
FIG. 5 is a flowchart showing a routine of pre-alignment pre-process with a reference wafer WF1.
Figure 8:
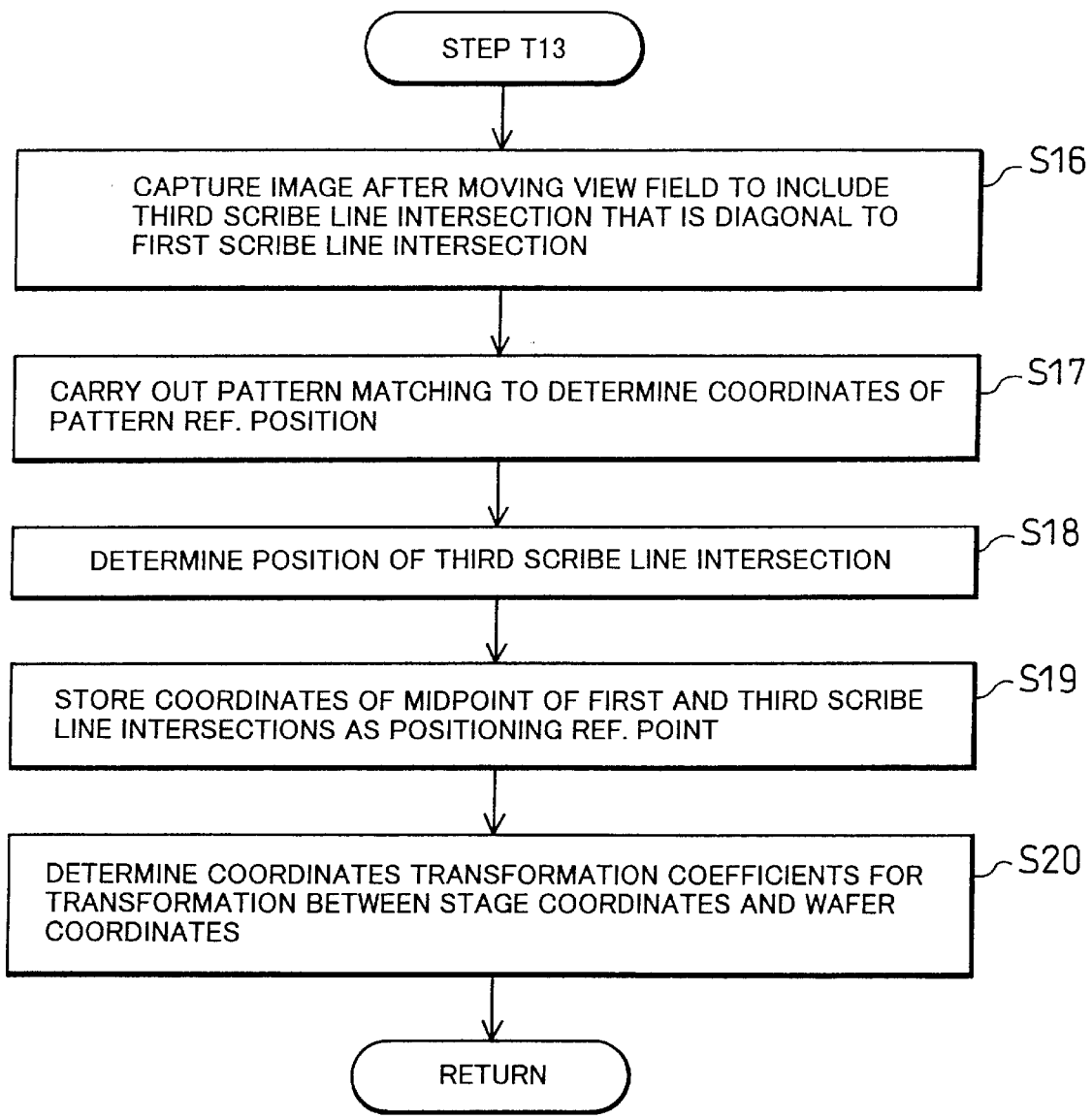
FIG. 8 is a flowchart showing the details of the processing of step T13 of FIG. 5 that determines coordinates transform coefficients for transformation between wafer coordinates and stage coordinates.

At step T13 of FIG. 5, transform coefficients are determined for transformation between wafer coordinates and stage coordinates. FIG. 8 is a flowchart showing the details of the processing of step T13. At step S16 of FIG. 8, the XY stage 36 is moved to locate the view field at the position of a third scribe line intersection that is diagonal to the first scribe line intersection, and an image is captured at that position. At subsequent step S17, pattern matching is carried out for the captured image, so as to detect an image pattern MPc that matches the first template image MPa.

Figure 20:
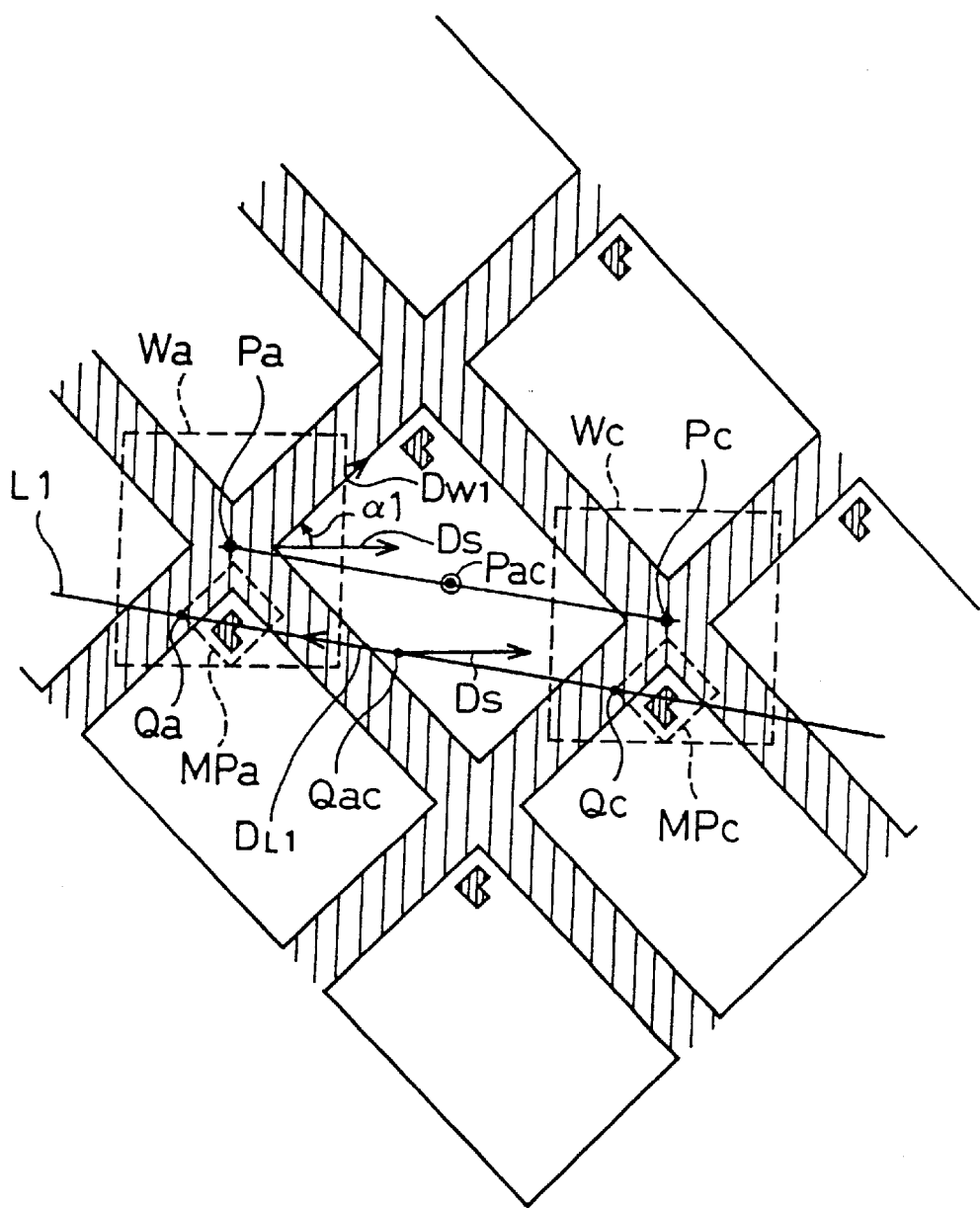
FIG. 20 shows the processing of steps S16 and S17 of FIG. 8.

FIG. 20 shows the processing of steps S16 and S17. In this example, a view field Wc is moved from the position of the first scribe line intersection, at which the first template image MPa is obtained, to the position of the third scribe line intersection that is off to the lower right of the first scribe line intersection.

The process at step S 17 also calculates stage coordinates of a reference point Qc of the matching pattern MPc. The process then determines the position of the third scribe line intersection Pc (see FIG. 20) at step S18. It is here assumed that the positional relationship between the third scribe line intersection Pc and the matching pattern MPc is identical with that between the first scribe line intersection Pa and the template image MPa. The position of the third scribe line intersection Pc is thus calculated from the position of the reference point Qc of the matching pattern MPc and the positional relationship between the first scribe line intersection Pa and the reference point Qa of the template image MPa.

Alternatively, the position of the third scribe line intersection Pc may be determined according to the same method as that of determining the first scribe line intersection Pa. It means that the user may specify the position of the third scribe line intersection Pc or alternatively that the position of the third scribe line intersection Pc may be determined automatically by analyzing the image in the third view field Wc.

At step S19, stage coordinates of a midpoint Pac between the first and the third scribe line intersections Pa and Pc are calculated and stored as the coordinates of the positioning reference point (the point RP in FIG. 3(A)) into the measurement recipe 139. The positioning reference point RP is used as the origin for determining the position of each measurement position (that is, the origin in the wafer coordinate system). In this embodiment, the coordinates of the positioning reference point RP are calculated from the coordinates of the two scribe line intersections Pa and Pc that are diagonal to each other in a lattice defined by the scribe lines. This enables the position of the positioning reference point to be set with high accuracy.

The positioning reference point RP may be set according to any of other available methods. By way of example, a midpoint Qac between the reference points Qa and Qc of the two image patterns MPa and MPc may be used as the positioning reference point. In another example, one selected among the scribe line intersections Pa and Pc and the reference points Qa and Qc may be used as the positioning reference point.

The rotation angle θ1 of the reference wafer WF1 is obtained as the sum of the image rotation angle β1 and the rotation angle δ of the image pickup optical system as shown in FIG. 19. Alternatively the rotation angle θ1 may be determined from the direction of a line segment that connects the reference points Qa and Qc of the two image patterns MPa and MPc. In this case, the reference direction D1 of the wafer is defined to be what is rotated from a connecting direction DL1 of the two reference points Qa and Qc by a predetermined angle Δθ, as shown in the lower portion of FIG. 20. Since the two reference points Qa and Qc are located diagonal to each other in chips arranged in lattice, the predetermined angle Δθ is given as tanΔθ=LY/LX (where LX and LY denote pitches of the chips). The accurate rotation angle θ1 of the wafer is an angle between the reference direction D1 of the wafer and the reference direction Ds of the stage coordinate system. When the rotation angle θ1 is determined in this manner, the rotation angle δ of the image pickup optical system can be determined by subtracting the image rotation angle β1 from the rotation angle θ1 of the wafer (see FIG. 19). In this case, the processing of step T12 of FIG. 5 (that is, steps S13 through S15 of FIG. 7) may be omitted.

At step T13 of FIG. 5, coordinates transform coefficients for transformation between stage coordinates (X,Y) and wafer coordinates (ξη) is determined from the stage coordinates ($X_{RP}$, $Y_{RP}$) of the positioning reference point RP and the rotation angle θ1 of the reference wafer. The coordinates transform coefficients are expressed as a 3×3 matrix in the right-hand side of the two-dimensional affine transformation according to Equation 2:

$$[X \ Y \ 1] = [\xi \ \eta \ 1] \begin{bmatrix} \cos\theta 1 & \sin\theta 1 & 0 \\ -\sin\theta 1 & \cos\theta 1 & 0 \\ X_{RP} & Y_{RP} & 1 \end{bmatrix} \quad (2)$$

As the result of the pre-alignment pre-process with respect to the reference wafer, the following pieces of information are registered in the measurement recipe 139 (see FIG. 2):
(a) Image rotation angle β1;
(b) Rotation angle δ of the image pickup optical system;
(c) Rotation angle θ1 of the reference wafer;
(d) Image data of the template image MPa; and
(e) Stage coordinates ($X_{RP}$, $Y_{RP}$) of the positioning reference point RP.

The information including the above items (a)–(d) can be considered as coordinates transformation information that defines transformation between the image coordinates, the stage coordinates, and the wafer coordinates. As clearly understood from Equation 2 given above, the rotation angle θ1 of the reference wafer and the stage coordinates ($X_{RP}$, $Y_{RP}$) of the positioning reference point RP are used as the coordinates transform coefficients for transformation between wafer coordinates and stage coordinates. The rotation angle δ of the image pickup optical system is used as the coordinates transform coefficient for transformation between image coordinates and stage coordinates. These coordinates transform coefficients enable arbitrary transformation between the image coordinates, the stage coordinates, and the wafer coordinates. For example, image coordinates of an arbitrary position in the captured image may be transformed into stage coordinates or wafer coordinates. Wafer coordinates of an arbitrary position on the wafer may, on the other hand, be transformed into stage coordinates or image coordinates.

D. Fine Alignment Pre-Process with Reference Wafer

Figure 21:
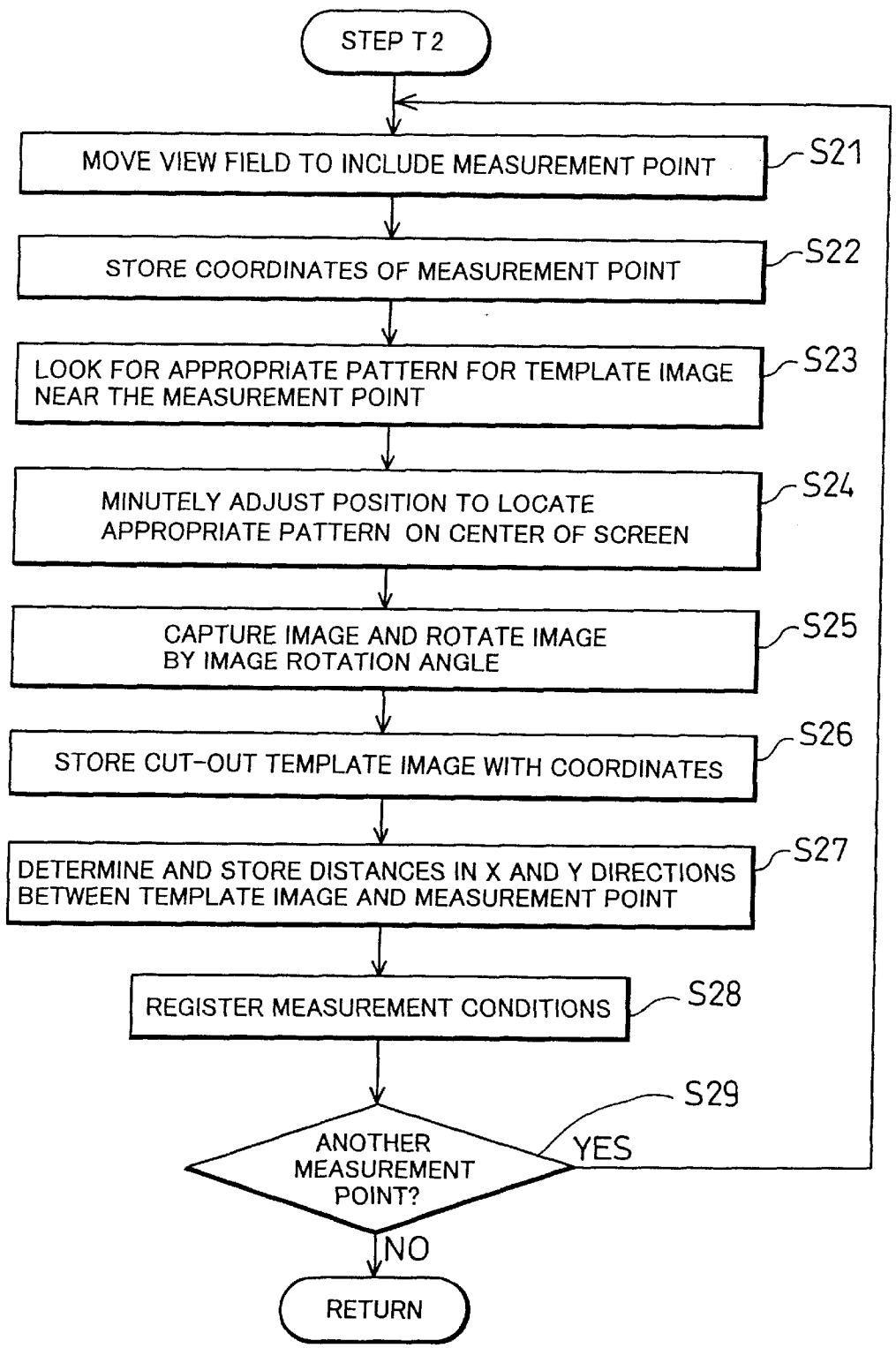
FIG. 21 is a flowchart showing a routine of fine alignment pre-process with the reference wafer WF1.

FIG. 21 is a flowchart showing a routine of the fine alignment pre-process with the reference wafer WF1. In the fine alignment pre-process, positions of a plurality of measurement points PM1–PM15 (shown by the open circles in FIG. 3(A)) on the reference wafer WF1 are registered by their coordinates in the wafer coordinate system in the manner described below, and measurement conditions at the respective measurement points are also registered.

Figure 22:
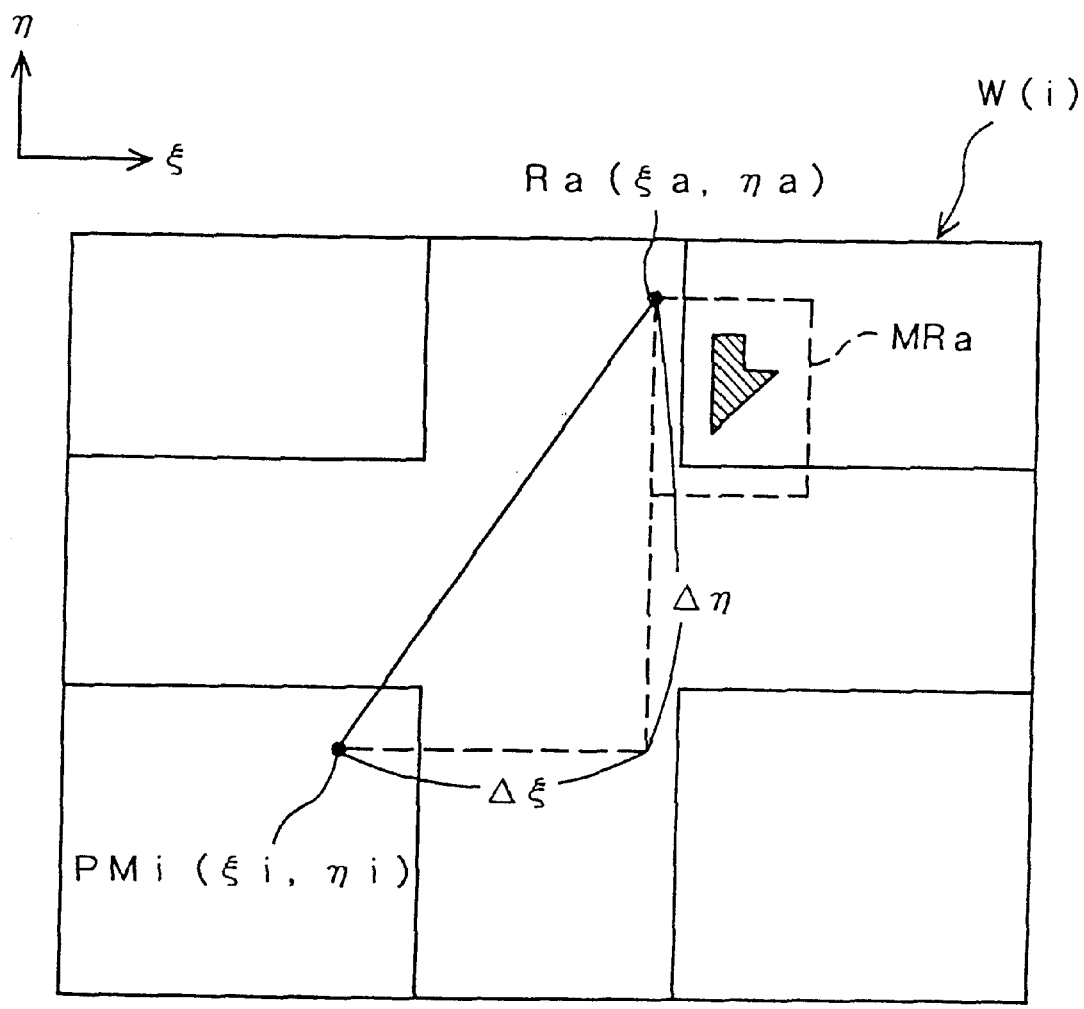
FIG. 22 shows a view field W(i) including an i-th measurement point PMi in the fine alignment pre-process of the reference wafer WF1.

At step S21, the user specifies the position of a view field including a measurement point (for example, PM1 in FIG. 3(A)) to move the XY stage 36 there. FIG. 22 shows a view field W(i) including an i-th measurement point PMi. This view field W(i) is at a upright state after rotation of the image rotation angle β1 by affine transformation. The respective positions are defined by coordinates (ξη) in the wafer coordinate system.

At step S22 of FIG. 21, the user specifies the position of the i-th measurement point PMi on the screen shown in FIG. 22 with a pointing device, such as a mouse. Stage coordinates (ξi, ηi) of the measurement point PMi are then stored in the measurement recipe 139. At subsequent step S23, the user looks for an appropriate image pattern as a second template image MRa in the vicinity of the measurement point PMi. It is preferable that the appropriate image pattern as the second template image MRa does not have rotational symmetry of any one of integral multiples of 90 degrees.

After finding the appropriate image pattern, the user adjusts the position of the XY stage 36 to locate the image pattern at the center of the screen at step S24. At step S25, an image within the field is captured and the captured image is rotated by the image rotation angle β1.

At subsequent step S26, the user specifies the area of the second template image MRa. Image data of the second template image MRa are then stored with wafer coordinates (ξa, ηa) of a reference point Ra in the second template image MRa.

The second template image MRa may be identical with the first template image MPa (FIG. 17(C)) used in the pre-alignment pre-process. For example, when the first template image MPa is present in the vicinity of each measurement point, the pattern matching unit 154 (FIG. 2) may carry out pattern matching with the first template image MPa and determines the position of the reference point Ra, instead of the processing of step S26.

The process at step S27 calculates an offset (Δξ,Δη) of the coordinates of the i-th measurement point PMi from the coordinates of the reference point Ra of the second template image MRa and stores the offset into the measurement recipe 139. The position of the measurement point PMi is specified by the user as mentioned previously. The offset (Δξ,Δη) of the coordinates represents information on the positional relationship between the i-th measurement point PMi and the second template image MRa that is present in the vicinity of the i-th measurement point PMi.

At subsequent step S28, the user sets measurement conditions at the measurement point PMi. By way of example, for measurement of the thickness of a thin film on the surface of the wafer, the measurement conditions include: the material of the thin film to be measured (for example, $SiO_2$ or SiN), the optical constants of the thin film, and a possible range of the film thickness. It is not necessary to set the measurement conditions at each measurement point, but the same measurement conditions may be commonly applied to all the measurement points.

At step S29, it is determined whether or not there is another measurement point to be specified. When there is another measurement point, the process returns to step S21 and repeats the processing of steps S21 through S28 described above. When the processing of steps S21 through S28 is completed for all the measurement points, the process concludes the fine alignment pre-process with respect to the reference wafer WF1.

The second template image MRa may be used commonly for all the measurement points, or alternatively different image patterns may be set for the respective measurement points.

The above fine alignment pre-process with the reference wafer WF1 produces the measurement recipe 139 including the following information with respect to a plurality of measurement points:

(a) Image data of the second template image MRa;
(b) Wafer coordinates (ξi, ηi) of each measurement point PMi;
(c) Offset (Δξ,Δη) of coordinates of each measurement point PMi from coordinates of the reference point Ra of the matching image in the vicinity of the measurement point PMi; and
(d) Measurement conditions at each measurement point PMi.

The above items (a)–(c) are used to determine the position of each measurement point PMi in the wafer coordinate system and is hereinafter referred to as the "measurement position information". The position of each measurement point on the target wafer will be determined using the measurement position information. The processing of steps T1 and T2 completes registration of the measurement recipe 139 including the coordinates transformation information, the measurement position information, and the measurement conditions.

E. Pre-alignment Process with Target Wafer

The measurement with the target wafer WF2 can be executed with the first measurement device used in the registration of the measurement recipe, or with another second measurement device. When another second measurement device is used for the measurement, the measurement recipe 139 is transferred or copied from the first measurement device to the second measurement device. The coordinates transformation information suitable for the second measurement device are different from the coordinates transformation information for the first measurement device. Only the measurement position information and the measurement conditions stored in the measurement recipe 139 would thus be transferred to the second measurement device.

Figure 23:
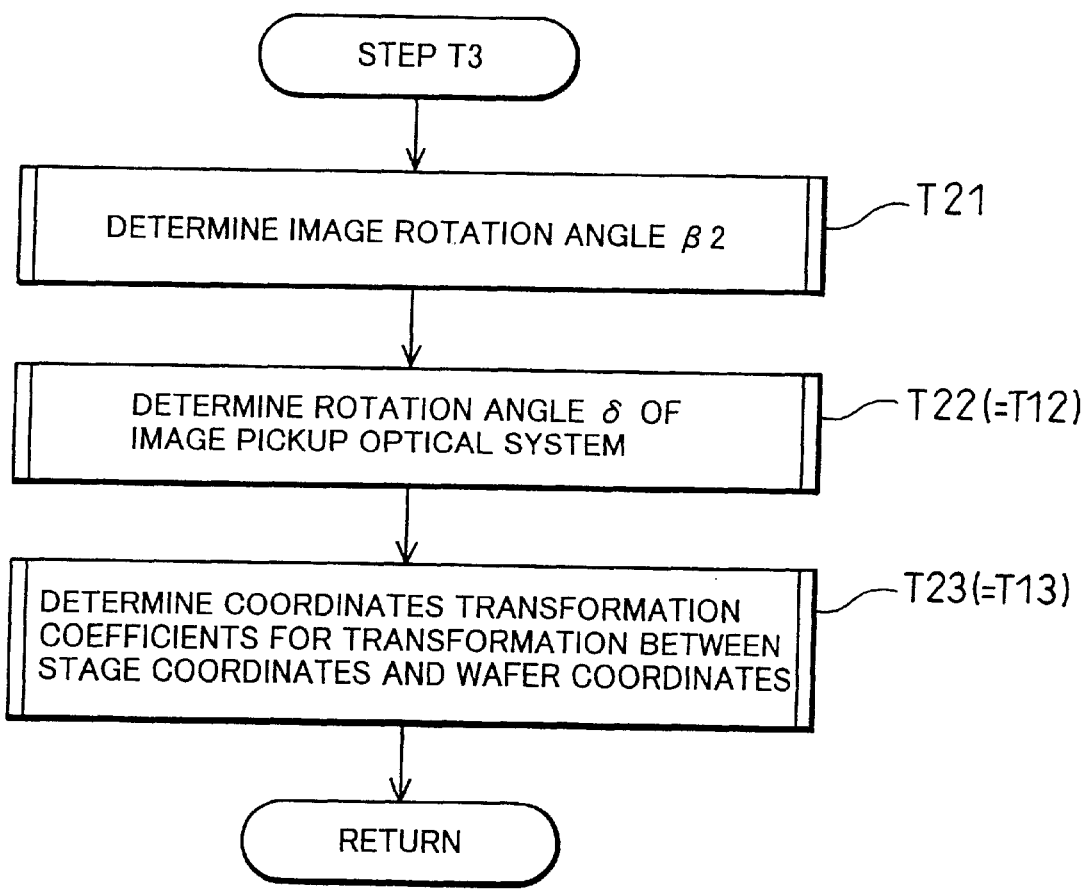
FIG. 23 is a flowchart showing a routine of pre-alignment process with a target wafer.

FIG. 23 is a flowchart showing a routine of the pre-alignment process with respect to a target wafer. The processing of steps T22 and T23 of FIG. 23 is identical with the processing in the pre-alignment pre-process with respect to the reference wafer. The only difference is the processing of step T21 where an image rotation angle β2 of the target wafer is determined. when the first measurement device used in the registration of the measurement recipe is used in the measurement of the target wafer WF2, the rotation angle δ of the image pickup optical system is unchanged, and therefore step T22 can be omitted and only steps T21 and T23 are to be executed. When the second measurement device that is different from the first measurement device is used in the measurement of the target wafer, on the other hand, step T22 as well as steps T21 and T23 are to be carried out. The following description mainly refers to the case in which the second measurement device that is different from the first measurement device is used in the measurement of the target wafer.

Figure 24:
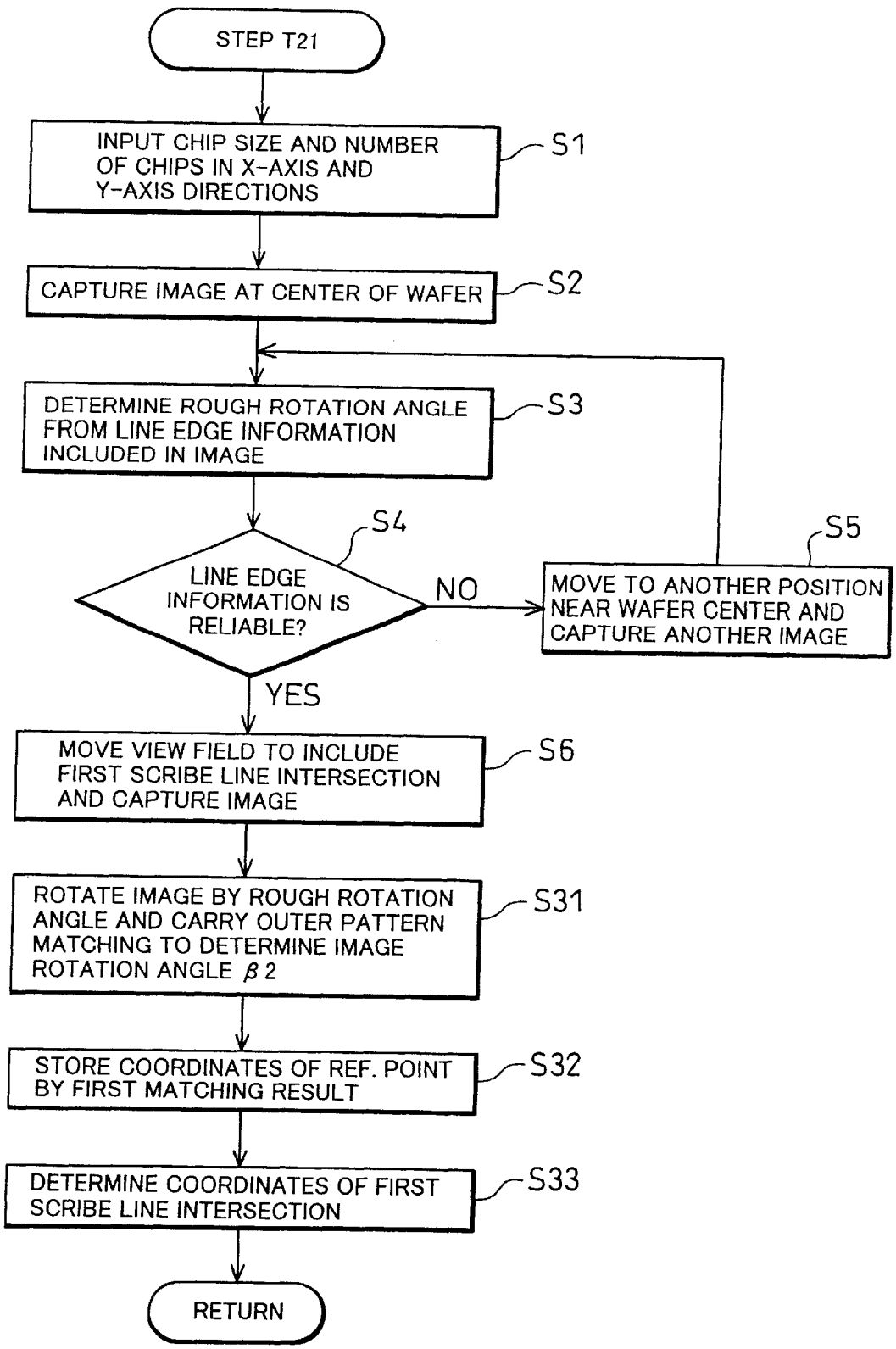
FIG. 24 is a flowchart showing the details of step T21 of FIG. 23 to determine an image rotation angle β2 of the target wafer.
Figure 25:
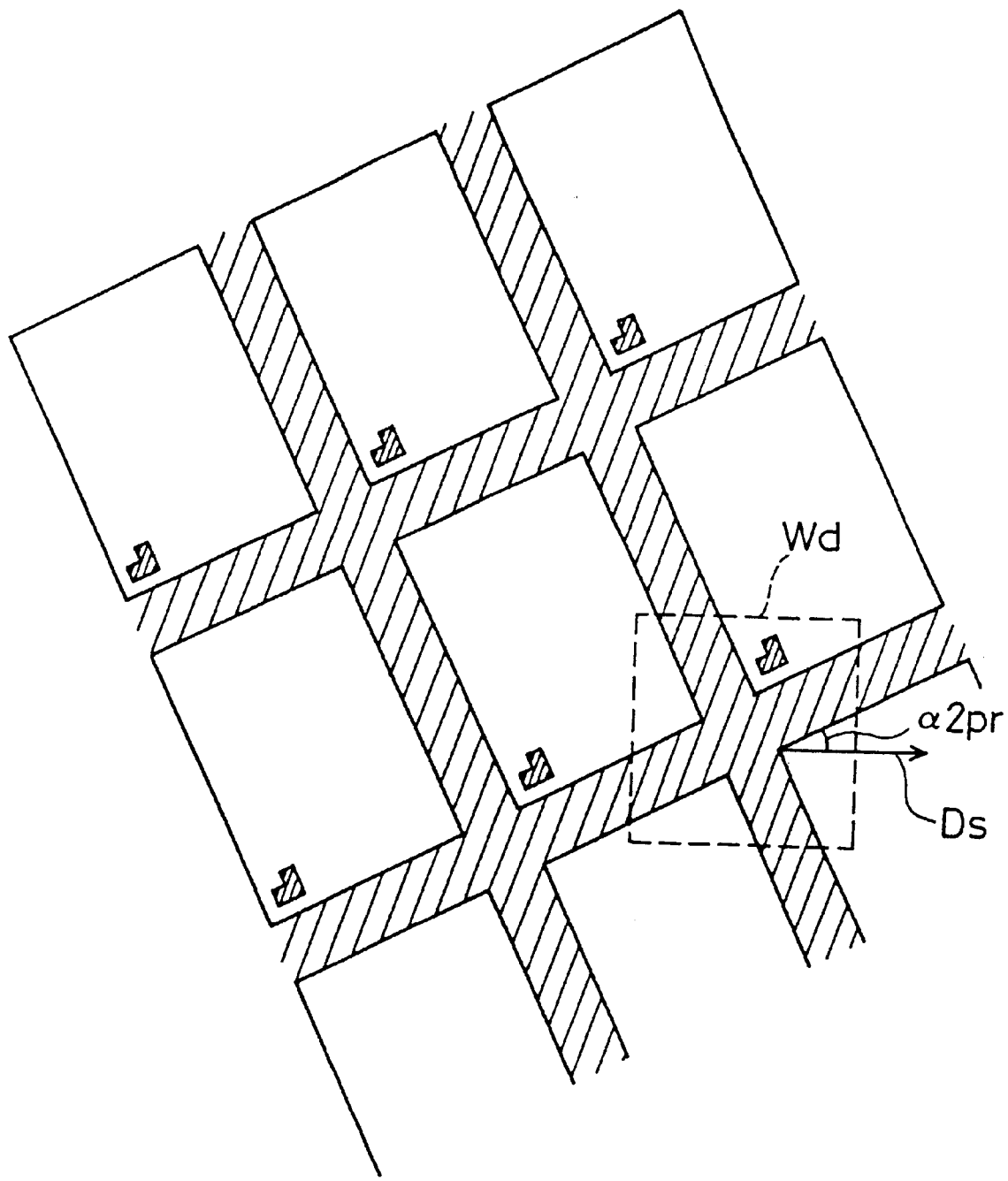
FIG. 25 shows a view field set on the target wafer as an example.

FIG. 24 is a flowchart showing the details of the processing of step T21 of FIG. 23. The processing of steps S1 through S6 is identical with that in the pre-alignment pre-process with respect to the reference wafer shown in FIG. 6; an image is captured at a scribe line intersection in the vicinity of the center of the wafer. FIG. 25 shows a view field Wd set on the target wafer. The image in the view field Wd is captured at step S6 while a rough rotation angle α2pr shown in FIG. 25 is measured at step S3. The rough rotation angle α2pr includes the uncertainty of integral multiples of 90 degrees. The rough rotation angle on the target wafer prior to removal of the uncertainty may be referred to as the "preliminary rotation angle". This term indicates that the value is the preliminary rotation angle including uncertainty.

At step S31, the pattern matching unit 154 (FIG. 2) carries out pattern matching for the image in the field Wd using the first template image MPa that has been registered in the pre-process for the reference wafer.

FIGS. 26(A) through 26(C) show a method of pattern matching with respect to the target wafer. The captured image shown in FIG. 26(A) is rotated clockwise by the preliminary rotation angle α2pr by affine transformation to produce an image shown in FIG. 26(B). The pattern matching process is then carried out for the rotated image to find an image pattern that matches the first template image MPa. It is here preferable that four template images rotated by every 90 degrees are produced in advance as shown in FIG. 26(C). The template image having the highest matching degree is then selected among the four template images, and coordinates of a reference point in the matching pattern that matches the selected template image is determined. In the example of FIG. 26(B), the template image rotated by 180 degrees has the highest matching degree.

The image rotation angle β2 of the target wafer is thus specified as (α2pr+180 degrees). The pattern matching process using the template image removes the uncertainty of the preliminary rotation angle α2pr and determines the image rotation angle β2. The angle selected by pattern matching among the four angles ( 0°, 90°, 180°, 270°), which are related to the four rotationally symmetrical template images, is hereinafter referred to as the "matching angle".

Figure 27:
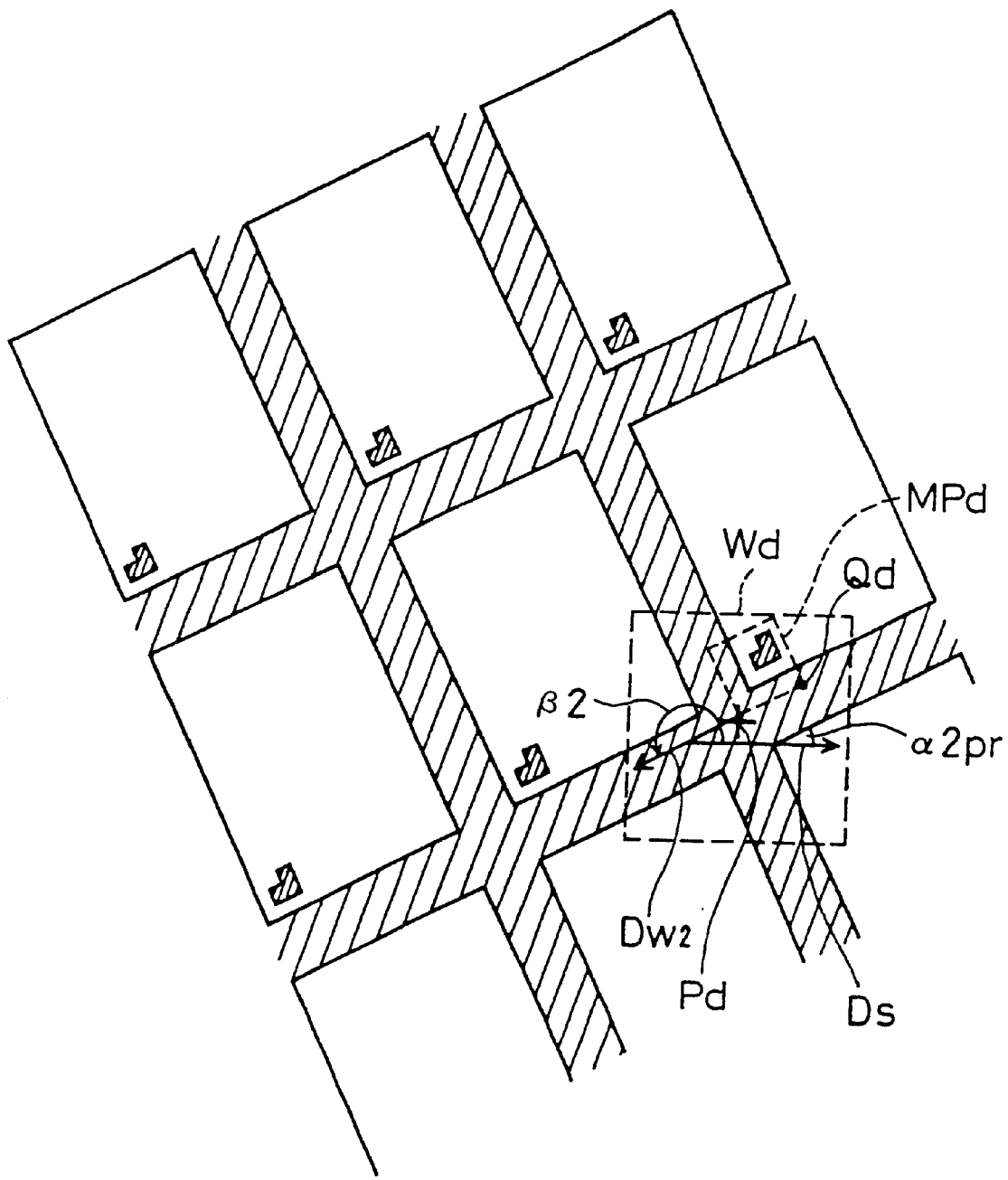
FIG. 27 shows the relationship between a preliminary rotation angle α2pr and an image rotation angle β2 on the target wafer.

FIG. 27 shows the relationship between the preliminary rotation angle α2pr and the image rotation angle β2 of the target wafer. In this example, there is a difference of 180 degrees between the preliminary rotation angle α2pr and the image rotation angle β2. These angles α2pr and β2 may, however, be equal to each other.

At step S32 of FIG. 24, wafer coordinates (ξqd, ηqd) of a reference point Qd in a matching pattern MPd are stored. At subsequent step S33, the process determines coordinates of a first scribe line intersection Pd (see FIG. 27) that is in the vicinity of the matching pattern MPd. FIGS. 28(a)–28(d) show the relationships between the reference point Qd of the matching pattern MPd and the first scribe line intersection Pd. As described previously, the image pattern matches the template image at one of the four matching angle states shown in FIGS. 28(a)–28(d). Wafer coordinates (ξd, ηd) of the first scribe line intersection Pd are calculated in the following manner according to the matching angle:

(a) when the matching angle is 0 degree:

$$\xi d=\xi qd+\Delta\xi,\ \eta d=\eta qd+\Delta\eta$$

(b) when the matching angle is 90 degrees:

$$\xi d=\xi qd+\Delta\eta,\ \eta d=\eta qd-\Delta\xi$$

(c) when the matching angle is 180 degrees:

$$\xi d=\xi qd-\Delta\xi,\ \eta d=\eta qd-\Delta\eta$$

(d) when the matching angle is 270 degrees:

$$\xi d=\xi qd-\Delta\eta,\ \eta d=\eta qd+\Delta\xi$$

where Δξ and Δη denotes the offset of the coordinates of the scribe line intersection Pa from the coordinates of the reference point Qa of the template image MPa (FIG. 17(B)); they have been determined in the pre-alignment pre-process of the reference wafer. Using this offset (Δξ,Δη), the wafer coordinates (ξd, ηd) of the scribe line intersection Pd are calculated from the wafer coordinates of the reference point Qd of the matching pattern MPd as given above.

After completion of the processing of step T21 with respect to the target wafer WF2, the processing at steps T22 and T23 of FIG. 23 determines the rotation angle δ of the image pickup optical system and the coordinates transform coefficients for transformation between stage coordinates and wafer coordinates. The processing of steps T22 and T23 is identical with that of steps T12 and T13 with respect to the reference wafer and is thus not specifically described here.

F. Fine Alignment Process with Target Wafer

FIG. 29 is a flowchart showing a routine of the fine alignment process with the target wafer. At step S41, stage coordinates of the first measurement point are estimated based on the pre-alignment information obtained in the pre-alignment process, and the XY stage 36 is moved to the position of the template image (matching image) that is in the vicinity of the measurement point. In this process, the coordinates transformation unit 164 first transforms wafer coordinates of each measurement point included in the measurement recipe 139 into stage coordinates. The stage coordinates of the measurement point obtained by the transformation might, however, be deviated a little from the actual stage coordinates of the measurement point due to, for example, deflection of the stage. The stage coordinates obtained by the transformation are accordingly used to predict the position of the measurement point, and the accurate position of the measurement point is determined by the pattern matching process described below. The stage coordinates obtained by the transformation represent the estimated position of the measurement point and are thereby referred to as the "estimated value". The accurate position of the measurement point determined by the pattern matching process is referred to as the "observed position", and the coordinates of the accurate position are referred to as the "observed value".

Figure 30:
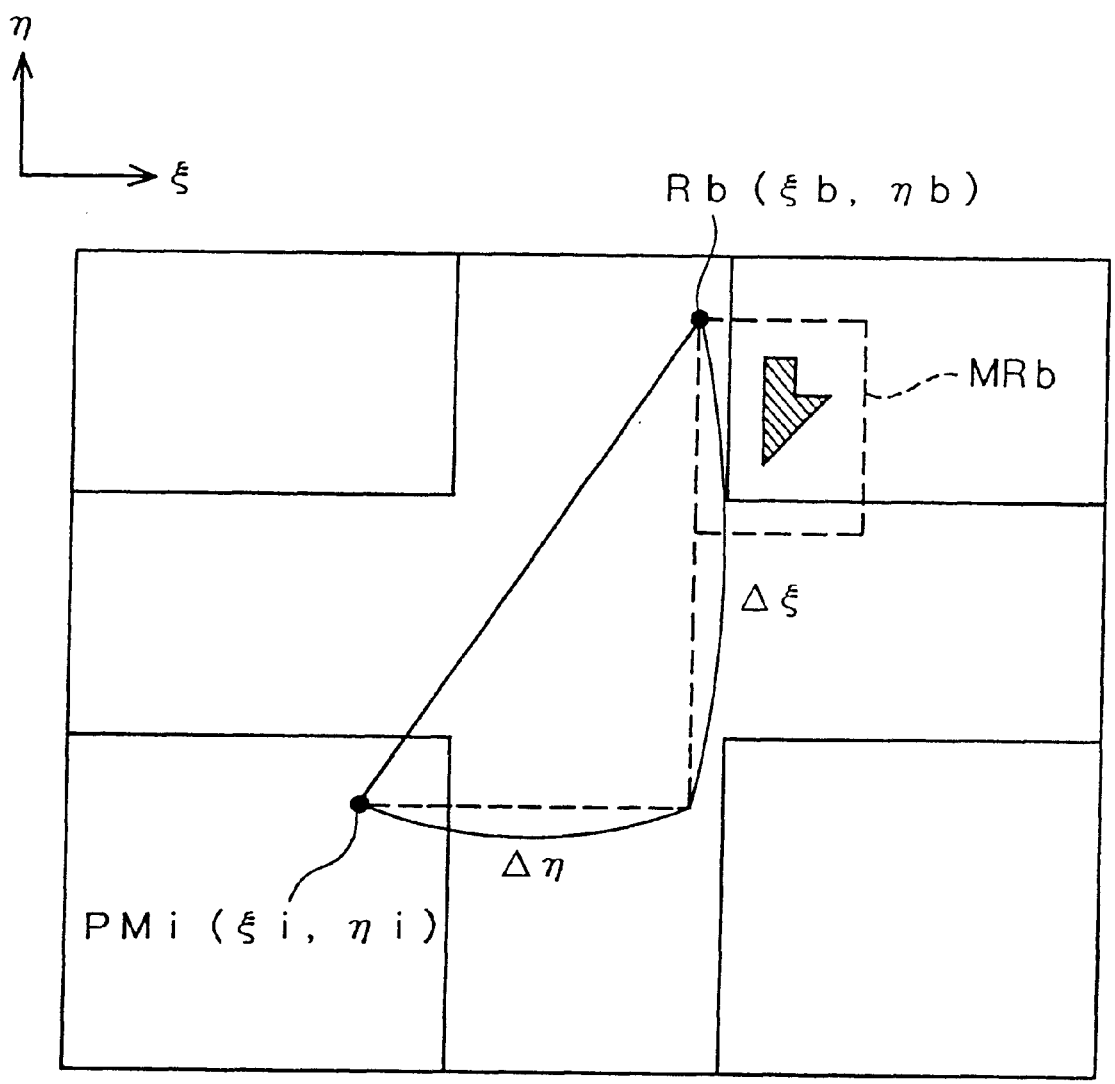
FIG. 30 shows a rotated image obtained in the vicinity of a measurement point in the fine alignment process with the target wafer.

At step S42, an image in the vicinity of the estimated position of the measurement point is captured and rotated by the image rotation angle β2 obtained in the pre-alignment process. FIG. 30 shows the image after the rotation. The image of FIG. 30 is substantially the same as that of FIG. 22 in the fine-alignment process with respect to the reference wafer. The positions of the respective points in FIG. 30 are expressed by coordinates in the wafer coordinate system.

At step S43 of FIG. 29, pattern matching is carried out using the second template image MRa (see FIG. 22) to determine a matching pattern MRb (see FIG. 30). At subsequent step S44, the process determines wafer coordinates (ξb, ηb) of a reference point Rb in the matching pattern MRb. The process then corrects the wafer coordinates (ξb, ηb) of the reference point Rb using the offset (Δξ,Δη) of the coordinates of the measurement point PMi from the coordinates of the reference point Ra with respect to the reference wafer, thereby determining the observed position of the measurement point PMi at step S45. The observed position of the measurement point PMi is then transformed into coordinates in the stage coordinate system. The measurement probe is thus accurately located at the measurement point PMi based on the observed position of the measurement point PMi.

It is determined at step S46 whether or not there is another measurement point to be processed. When there is another measurement point to be processed, the process returns to step S41 and repeats the processing of steps S41 through S45. The repeated execution of steps S41 through S45 with respect to the plurality of measurement points PM1–PM15 on the target wafer (see FIG. 3) accurately determines the observed positions of the respective measurement points. The measurement (for example, film thickness measurement) at each measurement point may be carried out between steps S45 and S46. Alternatively the measurements at the respective measurement points may be carried out successively after the processing of steps S41 through S45 are completed for all the measurement points.

Since the positions of the respective measurement points are stored in the measurement recipe 139 by their coordinates in the wafer coordinate system, the wafer coordinates of the respective measurement points can be transformed into stage coordinates to determine the positions of the respective measurement points on the target wafer. The above embodiment utilizes the position indicated by the stage coordinates which have been transformed from the wafer coordinates as the estimated position of the measurement point and carries out the pattern matching process in the vicinity of the estimated position. This enables the observed position of each measurement point to be determined accurately. In another possible procedure, the pattern matching process for determining the accurate observed position of each measurement point PMi is omitted, and stage coordinates transformed from the wafer coordinates of each measurement point PMi are directly used as the observed coordinates. Use of the pattern matching process, however, determines the position of each measurement point with higher accuracy.

Part of the structure realized by the hardware circuitry in the above embodiment may be replaced by software, whereas part of the structure realized by the software may be replaced by hardware circuitry.

The first pattern matching for determining the coordinates of the positioning reference point RP is to be carried out for the image of an area that is in the vicinity of the positioning reference point RP, but it is not required to be carried out for the image that includes the positioning reference point RP. In a similar manner, the second pattern matching for determining the coordinates of each measurement point is not required to be carried out for the image that includes the measurement point, but it is to be carried out for the image of an area that is in the vicinity of the measurement point.

The above embodiment performs the pattern matching for the two different areas in order to determine the position of the positioning reference point RP and the rotation angle $\theta 1$ (or $\theta 2$) of the wafer. In another possible procedure, the pattern matching may be executed only for one area in order to determine the position of the positioning reference point RP and the rotation angle $\theta 1$ (or $\theta 2$) of the wafer. In still another possible procedure, the pattern matching may be executed for three or more different areas in order to determine the position of the positioning reference point RP and the rotation angle $\theta 1$ (or $\theta 2$) of the wafer. The pattern matching may be carried out every time in determining a position of a measuring point. In general, an increase in number of areas that are subjected to the pattern matching improves the accuracy of the coordinates and the rotation angle thus determined.

Although the above embodiment refers to the measurement device without the wafer rotating mechanism, the present invention is also applicable to the measurement device with the rotating mechanism. Even in the measurement device with the rotating mechanism, the technique of the present invention can detect the orientation (rotation angle) of the wafer by the image processing, thereby facilitating the positioning of the measurement points.

Incidentally, the measurement recipe 139 is not required to include the measurement conditions at the respective measurement points, but it includes at least information indicating positions of the respective measurement points.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of determining a measurement position on a semiconductor wafer mounted on a stage of a measuring device, the method comprising the steps of:
   (A) determining:
      (1) a first set of transform coefficients between an image coordinate system defined in an area of a captured image of the wafer and a stage coordinate system defined on the stage; and
      (2) a second set of transform coefficients between the stage coordinate system and a wafer coordinate system defined on the wafer;
   (B) measuring the position of a plurality of points on the wafer relative to the image coordinate system; and
   (C) determining the position of each of the plurality of points on the wafer relative to the wafer coordinate system as a function of the measured positions and the first and second sets of transform coefficients.

2. A method in accordance with claim 1, wherein the position of each of the plurality of points on the wafer relative to the image coordinate system is expressed as respective coordinates on the image coordinate system and the step of determine the position of each measurement point comprises the steps of:
   (1) transforming the coordinates of each of the plurality of points in the image coordinate system into corresponding first coordinates in the stage coordinate system using the first set of transformation coefficients; and
   (2) transforming each of the first coordinates into corresponding coordinates in the wafer coordinate system using the second set of transform coefficients.

3. Apparatus for determining a measurement position on a semiconductor wafer mounted on a stage of a measuring device, the apparatus comprising:
   (A) means for determining:
      (1) a first set of transform coefficients between an image coordinate system defined in an area of a captured image of the wafer and a stage coordinate system defined on the stage; and
      (2) a second set of transform coefficients between the stage coordinate system and a wafer coordinate system defined on the wafer;
   (B) a measuring device for measuring the position of a plurality of points on the wafer relative to the image coordinate system; and
   (C) means for determining the position of each of the plurality of points on the wafer relative to the wafer coordinate system as a function of the measured positions and the first and second sets of transform coefficients.

4. Apparatus in accordance with claim 3, wherein the position of each of the plurality of points on the wafer relative to the image coordinate system is expressed as respective coordinates on the image coordinate system and the means for determine the position of each measurement point does so by:
   (1) transforming the coordinates of each of the plurality of points in the image coordinate system into corresponding first coordinates in the stage coordinate system using the first set of transformation coefficients; and (2) transforming each of the first coordinates into corresponding coordinates in the wafer coordinate system using the second set of transform coefficients.

5. A computer program product for determining a measurement position on a semiconductor wafer mounted on a stage of a measuring device, the product comprising:

(A) a computer readable medium; and (B) a computer program stored on the medium, the computer program being for:

(1) determining:

(a) a first set of transform coefficients between an image coordinate system defined in an area of a captured image of the wafer and a stage coordinate system defined on the stage; and (b) a second set of transform coefficients between the stage coordinate system and a wafer coordinate system defined on the wafer;

(2) measuring the position of a plurality of points on the wafer relative to the image coordinate system; and (3) determining the position of each of the plurality of points on the wafer relative to the wafer coordinate system as a function of the measured positions and the first and second sets of transform coefficients.

6. A computer program product in accordance with claim 5, wherein the position of each of the plurality of points on the wafer relative to the image coordinate system is expressed as respective coordinates on the image coordinate system and the computer program determines the position of each measurement point by carrying out at least the following acts:

(1) transforming the coordinates of each of the plurality of points in the image coordinate system into corresponding first coordinates in the stage coordinate system using the first set of transformation coefficients; and (2) transforming each of the first coordinates into corresponding coordinates in the wafer coordinate system using the second set of transform coefficients.

7. A method of determining a measurement position on a semiconductor wafer mounted on a stage of a measuring device, the measuring device comprising an image pickup device for capturing an image on the wafer mounted on the stage, the method comprising the steps of:

providing measurement information regarding a plurality of measurement points on the wafer, wherein the measurement information includes at least positions of the measurement points on the wafer, the position of each measurement point being expressed by coordinates in a wafer coordinate system defined on the wafer; and determining a position of each measurement point on the wafer mounted on the stage on the basis of the measurement information by:

(a) providing first transform coefficients for coordinate transformation between a stage coordinate system defined on the stage and the wafer coordinate system by providing second transform coefficients for coordinate transformation between the stage coordinate system and an image coordinate system defined within an image captured by the image pickup device;

(b) transforming coordinates of each measurement point in the wafer coordinate system which are included in the measurement information into first coordinates in the stage coordinate system using the first transform coefficients; and (c) positioning each measurement point on the wafer mounted on the stage using the first coordinates of each measurement point in the stage coordinate system by:

i) moving the image pickup device according to the first coordinates in the stage coordinate system obtained at step (b);

ii) capturing an image by the stage coordinate system;

iii) determining coordinates of each measurement point in the image coordinate system;

iv) transform coordinates in the image coordinate system into second coordinates in the stage coordinate system using the second transform coefficients; and v) positioning each measurement point on the wafer mounted on the stage according to the second coordinates of each measurement point in the stage coordinate system.

8. A method in accordance with claim 7, wherein the measurement information further includes a template image and a positional offset between a reference point of the template image and each measurement point, the template image being to be used to determine the position of each measurement point by carrying out pattern matching on an image captured by the image pickup device; and wherein the step iii) comprises the steps of:

carrying out the pattern matching on the image captured by the image pickup device in the vicinity of each measurement point to obtain a matching pattern that matches the template image; and determining the position of each measurement point from a position of a reference point of the matching pattern and the positional offset.

9. A method in accordance with claim 8, wherein the measurement information further includes measurement conditions at each measurement point, and wherein the method further comprises the step of carrying out measurement at each measurement point under the measurement conditions.

10. A measuring device for determining a measurement position on a semiconductor wafer mounted on a stage of the measuring device, the device comprising:

A) a memory for storing measurement information regarding a plurality of measurement points on the wafer, wherein the measurement information includes at least positions of the measurement points on the wafer, the position of each measurement point being expressed by coordinates in a wafer coordinate system defined on the wafer; and B) a position determination unit which determines a position of each measurement point on the wafer mounted on the stage on the basis of the measurement information, the position determination unit comprises:

1) a transform coefficient generator which generates first transform coefficients for coordinate transformation between a stage coordinate system defined on the stage and the wafer coordinate system;

2) a first coordinate transformer which transforms coordinates of each measurement point in the wafer coordinate system which are included in the measurement information into first coordinates in the stage coordinate system using the first transform coefficients; and 3) a positioning unit which determines the position of each measurement point on the wafer mounted on the stage using the first coordinates of each measurement point in the stage coordinate system;

C) an image pickup device for capturing an image on the wafer mounted on the stage; and wherein D) the transform coefficient generator has a function of generating second transform coefficients for coordinate transformation between the stage coordinate system and an image coordinate system defined within an image captured by the image pickup device; and wherein E) the positioning unit comprising:
   1) a first unit moving the image pickup device according to the first coordinates in the stage coordinate system obtained at step (B)(2);
   2) a second unit which determines coordinates of each measurement point in the image coordinate system in an image captured by the image pickup device;
   3) a second coordinate transformer which transforms coordinates in the image coordinate system into second coordinates in the stage coordinate system using the second transform coefficients; and
   4) a third unit which determines the position of each measurement point on the wafer mounted on the stage according to the second coordinates of each measurement point in the stage coordinate system.

11. A measuring device in accordance with claim 10, wherein the measurement information further includes a template image and a positional offset between a reference point of the template image and each measurement point, the template image being to be used to determine the position of each measurement point by carrying out pattern matching on an image captured by the image pickup device; and wherein the second unit comprises:
   a pattern matching unit which carries out the pattern matching on the image captured by the image pickup device in the vicinity of each measurement point to obtain a matching pattern that matches the template image; and
   a unit which determining the position of each measurement point from a position of a reference point of the matching pattern and the positional offset.

12. A measuring device in accordance with claim 11, wherein the measurement information further includes measurement conditions at each measurement point, and wherein the device further comprises:

a measuring unit which carries out measurement at each measurement point under the measurement conditions.

* * * * *

UNITED STATES PATENT AND TRADEMARK OFFICE
CERTIFICATE OF CORRECTION

PATENT NO.   : 6,363,168 B1
DATED        : March 26, 2002
INVENTOR(S)  : Hiroaki Kakuma It is certified that error appears in the above-identified patent and that said Letters Patent is hereby corrected as shown below:

<u>Title page,</u>
Item [73], Assignee should read -- Dainippon Screen Mfg. Co., Ltd. (JP) --

Signed and Sealed this

First Day of October, 2002

Attest:

Attesting Officer

JAMES E. ROGAN
*Director of the United States Patent and Trademark Office*